US011765726B2

(12) United States Patent
Imamura et al.

(10) Patent No.: US 11,765,726 B2
(45) Date of Patent: *Sep. 19, 2023

(54) RADIO TRANSMISSION DEVICE AND RADIO TRANSMISSION METHOD

(71) Applicant: Panasonic Holdings Corporation, Osaka (JP)

(72) Inventors: Daichi Imamura, Saitama (JP); Hidetoshi Suzuki, Kanagawa (JP); Akihiko Nishio, Osaka (JP); Atsushi Matsumoto, Ishikawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,352

(22) Filed: Aug. 30, 2022

(65) Prior Publication Data

US 2022/0417921 A1    Dec. 29, 2022

Related U.S. Application Data

(63) Continuation of application No. 17/037,518, filed on Sep. 29, 2020, now Pat. No. 11,470,583, which is a (Continued)

(30) Foreign Application Priority Data

May 19, 2006 (JP) .................. 2006-140462

(51) Int. Cl.
*H04W 72/20* (2023.01)
*H04L 1/00* (2006.01)
(Continued)

(52) U.S. Cl.
CPC ........... *H04W 72/20* (2023.01); *H04L 1/0009* (2013.01); *H04L 1/0025* (2013.01);
(Continued)

(58) Field of Classification Search
CPC ............ H04W 72/0406; H04L 1/0029; H04L 1/0009; H04L 1/0025; H04L 1/1671; H04L 1/0007; H04L 1/0003
(Continued)

(56) References Cited

U.S. PATENT DOCUMENTS 6,850,759 B2    2/2005   Van Lieshout et al.
7,149,245 B2   12/2006   Budka et al.
(Continued)

FOREIGN PATENT DOCUMENTS

EP           1533926 A1    5/2005
KR    10-2005-0065296 A    6/2005
WO         WO 0028760 A2   5/2000

OTHER PUBLICATIONS

3GPP TS 25.212 V6.7.0, "3rd Generation Partnership Project; Technical Specification Group Radio Access Network; Multiplexing and channel coding (FDD) (Release 6)," Dec. 2005, (84 pages).
(Continued)

*Primary Examiner* — Kwang B Yao
*Assistant Examiner* — Syed M Bokhari
(74) *Attorney, Agent, or Firm* — Seed IP Law Group LLP

(57) ABSTRACT

Provided are a radio transmission device and a radio transmission method capable of improving downlink and uplink throughput even when performing dynamic symbol allocation. In the device and the method, BS and MS share a table correlating a basic TF as a combination of parameters such as TB size used for transmitting only user data, an allocation RB quantity, a modulation method, and an encoding ratio, with a derived TF having user data of different TB size by combining L1/L2 control information. Even when multiplexing L1/L2 control information, Index corresponding to the basic TF is reported from BS to MS.

18 Claims, 19 Drawing Sheets

Related U.S. Application Data continuation of application No. 15/216,641, filed on Jul. 21, 2016, now Pat. No. 10,827,466, which is a continuation of application No. 13/918,654, filed on Jun. 14, 2013, now Pat. No. 9,432,972, which is a continuation of application No. 12/301,441, filed as application No. PCT/JP2007/060258 on May 18, 2007, now Pat. No. 8,488,692.

(51) Int. Cl.
*H04L 1/1607* (2023.01)
*H04W 72/1268* (2023.01)

(52) U.S. Cl.
CPC .......... *H04L 1/0029* (2013.01); *H04L 1/0003* (2013.01); *H04L 1/0007* (2013.01); *H04L 1/1671* (2013.01); *H04W 72/1268* (2013.01)

(58) Field of Classification Search
USPC ........................................ 370/329, 331, 335
See application file for complete search history.

(56) References Cited

U.S. PATENT DOCUMENTS

| | | | |
|---|---|---|---|
| 7,257,423 B2 * | 8/2007 | Iochi | H04L 1/0026 370/335 |
| 7,289,452 B2 | 10/2007 | Malkamaki | |
| 7,573,854 B2 * | 8/2009 | Heo | H04L 1/0029 370/335 |
| 7,864,876 B2 | 1/2011 | Nam et al. | |
| 7,929,633 B2 | 4/2011 | Seo et al. | |
| 2003/0074476 A1 | 4/2003 | Kim et al. | |
| 2003/0123470 A1 | 7/2003 | Kim et al. | |
| 2005/0135499 A1 | 6/2005 | Nam et al. | |
| 2005/0152465 A1 * | 7/2005 | Maltsev | H04L 5/006 375/260 |
| 2005/0157687 A1 | 7/2005 | Heo et al. | |
| 2005/0237932 A1 | 10/2005 | Liu | |
| 2005/0254461 A1 * | 11/2005 | Shin | H04W 8/04 370/208 |
| 2006/0067229 A1 | 3/2006 | Frederiksen | |
| 2006/0107302 A1 | 5/2006 | Zdepski | |
| 2006/0133402 A1 * | 6/2006 | Dottling | H04L 1/0001 370/431 |
| 2006/0250941 A1 * | 11/2006 | Onggosanusi | H04L 1/0003 370/208 |
| 2006/0281417 A1 | 12/2006 | Umesh et al. | |
| 2006/0285481 A1 | 12/2006 | Lane et al. | |
| 2007/0049311 A1 | 3/2007 | Lindoff et al. | |
| 2007/0171849 A1 | 7/2007 | Zhang et al. | |
| 2008/0039145 A1 | 2/2008 | Ishii et al. | |
| 2012/0018883 A1 | 1/2012 | Shen et al. | |
| 2013/0272270 A1 | 10/2013 | Pietraski | |
| 2017/0094553 A1 | 3/2017 | Zeira et al. | |

OTHER PUBLICATIONS

3GPP TS 25.321 V6.7.0, "3rd Generation Partnership Project; Technical Specification Group Radio Access Network; Medium Access Control (MAC) protocol specification (Release 6)," Dec. 2005, (91 pages).

Ericsson, "Uplink Control Signaling for E-UTRA," R1-060111, TSG-RAN WG1 LTE AdHoc, Agenda Item: 5.2.2.3, Helsinki, Finland, Jan. 23-25, 2006, (3 pages).

Extended European Search Report, dated Apr. 1, 2015, for European Patent Application No. 14200199,9-1860. (12 pages).

Extended European Search Report, dated Feb. 19, 2014, for European Patent Application No. 07743693,9-1860. (13 pages).

Indian Office Action dated Dec. 26, 2018, for Indian Patent Application No. 2527/MUMNP/2014. (6 pages).

International Search Report, dated Aug. 14, 2007, for International Patent Application No. PCT/JP2007/060258. (with English translation) (3 pages).

NTT DoCoMo, NEC, Sharp, Toshiba Corporation, "L1/L2 Control Channel Structure for E-UTRA Uplink," R1-060320, Agenda Item: 13.2.2.3, 3GPP TSG-RAN WG1 Meeting #44, Denver, USA, Feb. 13-17, 2006. (7 pages).

NTT DoCoMo, Fujitsu, NEC, Sharp, Toshiba Corporation, "Single-Carrier Based Multiplexing of Uplink L1/L2 Control Channel," R1-061674, Agenda Item: 6.3.3, 3GPP TSG RAN WG1 Lte Ad Hoc, Cannes, France, Jun. 27-30, 2006. (9 pages).

Panasonic, "Indication of combination between L1/L2 control signaling and uplink data," R1-060793, Agenda Item: 10.2.2, TSG-RAN WG1 Meeting#44bis, Athens, Greece, Mar. 27-31, 2006. (3 pages).

Samsung, "Uplink control signalling structure," Tdoc R1-041373, Agenda item: 7, 3GPP TSG-RAN WG1 Meeting #39, Shin Yokohama, Japan, Nov. 15-19, 2004. (3 pages).

* cited by examiner

| TB INDEX | TB SIZE (BITS) | TB INDEX | TB SIZE (BITS) | TB INDEX | TB SIZE (BITS) | TB INDEX | TB SIZE (BITS) | TB INDEX | TB SIZE (BITS) |
|---|---|---|---|---|---|---|---|---|---|
| 0 | 18 | 30 | 342 | 60 | 1015 | 90 | 3008 | 120 | 8913 |
| 1 | 120 | 31 | 355 | 61 | 1053 | 91 | 3119 | 121 | 9241 |
| 2 | 124 | 32 | 368 | 62 | 1091 | 92 | 3234 | 122 | 9582 |
| 3 | 129 | 33 | 382 | 63 | 1132 | 93 | 3353 | 123 | 9935 |
| 4 | 133 | 34 | 396 | 64 | 1173 | 94 | 3477 | 124 | 10302 |
| 5 | 138 | 35 | 410 | 65 | 1217 | 95 | 3605 | 125 | 10681 |
| 6 | 143 | 36 | 426 | 66 | 1262 | 96 | 3738 | 126 | 11075 |
| 7 | 149 | 37 | 441 | 67 | 1308 | 97 | 3876 | 127 | 11484 |
| 8 | 154 | 38 | 458 | 68 | 1356 | 98 | 4019 | | |
| 9 | 160 | 39 | 474 | 69 | 1406 | 99 | 4167 | | |
| 10 | 166 | 40 | 492 | 70 | 1458 | 100 | 4321 | | |
| 11 | 172 | 41 | 510 | 71 | 1512 | 101 | 4480 | | |
| 12 | 178 | 42 | 529 | 72 | 1568 | 102 | 4645 | | |
| 13 | 185 | 43 | 548 | 73 | 1626 | 103 | 4816 | | |
| 14 | 192 | 44 | 569 | 74 | 1685 | 104 | 4994 | | |
| 15 | 199 | 45 | 590 | 75 | 1748 | 105 | 5178 | | |
| 16 | 206 | 46 | 611 | 76 | 1812 | 106 | 5369 | | |
| 17 | 214 | 47 | 634 | 77 | 1879 | 107 | 5567 | | |
| 18 | 222 | 48 | 657 | 78 | 1948 | 108 | 5772 | | |
| 19 | 230 | 49 | 682 | 79 | 2020 | 109 | 5985 | | |
| 20 | 238 | 50 | 707 | 80 | 2094 | 110 | 6206 | | |
| 21 | 247 | 51 | 733 | 81 | 2172 | 111 | 6435 | | |

FIG.1

| TF INDEX | NUMBER OF RB'S TO ALLOCATE | MULTIPLEXED DATA | NUMBER OF SYMBOLS ALLOCATED TO USER DATA | MODULATION SCHEME | CODING RATE | NUMBER OF BITS BEFORE FEC | TB SIZE [BIT] |
|---|---|---|---|---|---|---|---|
| 1 | 1 | DATA ONLY | 450 | QPSK | 1/6 | 150 | 106 |
| 2 | 1 | DATA ONLY | 450 | QPSK | 1/3 | 300 | 256 |
| 3 | 1 | DATA ONLY | 450 | QPSK | 1/2 | 450 | 406 |
| 4 | 1 | DATA ONLY | 450 | 16QAM | 1/3 | 600 | 556 |
| 5 | 1 | DATA ONLY | 450 | 16QAM | 1/2 | 900 | 856 |
| 6 | 1 | DATA ONLY | 450 | 16QAM | 2/3 | 1200 | 1156 |
| 7 | 1 | DATA ONLY | 450 | 16QAM | 3/4 | 1350 | 1306 |
| 8 | 2 | DATA ONLY | 900 | QPSK | 1/6 | 300 | 256 |
| 9 | 2 | DATA ONLY | 900 | QPSK | 1/3 | 600 | 556 |
| 10 | 2 | DATA ONLY | 900 | QPSK | 1/2 | 900 | 856 |
| 11 | 2 | DATA ONLY | 900 | 16QAM | 1/3 | 1200 | 1156 |
| 12 | 2 | DATA ONLY | 900 | 16QAM | 1/2 | 1800 | 1756 |
| 13 | 2 | DATA ONLY | 900 | 16QAM | 2/3 | 2400 | 2356 |
| 14 | 2 | DATA ONLY | 900 | 16QAM | 3/4 | 2700 | 2656 |
| 15 | 3 | DATA ONLY | 1350 | QPSK | 1/6 | 450 | 406 |
| 16 | 3 | DATA ONLY | 1350 | QPSK | 1/3 | 900 | 856 |
| 17 | 3 | DATA ONLY | 1350 | QPSK | 1/2 | 1350 | 1306 |
| 18 | 3 | DATA ONLY | 1350 | 16QAM | 1/3 | 1800 | 1756 |
| 19 | 3 | DATA ONLY | 1350 | 16QAM | 1/2 | 2700 | 2656 |
| 20 | 3 | DATA ONLY | 1350 | 16QAM | 2/3 | 3600 | 3556 |
| 21 | 3 | DATA ONLY | 1350 | 16QAM | 3/4 | 4050 | 4006 |
| 22 | 4 | DATA ONLY | 1800 | QPSK | 1/6 | 600 | 556 |
| 23 | 4 | DATA ONLY | 1800 | QPSK | 1/3 | 1200 | 1156 |
| 24 | 4 | DATA ONLY | 1800 | QPSK | 1/2 | 1800 | 1756 |
| 25 | 4 | DATA ONLY | 1800 | 16QAM | 1/3 | 2400 | 2356 |
| 26 | 4 | DATA ONLY | 1800 | 16QAM | 1/2 | 3600 | 3556 |
| 27 | 4 | DATA ONLY | 1800 | 16QAM | 2/3 | 4800 | 4756 |
| 28 | 4 | DATA ONLY | 1800 | 16QAM | 3/4 | 5400 | 5356 |

FIG.2

| TF INDEX | NUMBER OF RB'S TO ALLOCATE | MULTIPLEXED DATA | TB SIZE [BIT] | TF INDEX | NUMBER OF RB'S TO ALLOCATE | MULTIPLEXED DATA | TB SIZE [BIT] | TF INDEX | NUMBER OF RB'S TO ALLOCATE | MULTIPLEXED DATA | TB SIZE [BIT] | TF INDEX | NUMBER OF RB'S TO ALLOCATE | MULTIPLEXED DATA | TB SIZE [BIT] |
|---|---|---|---|---|---|---|---|---|---|---|---|---|---|---|---|
| 1 | 1 | DATA ONLY | 106 | 29 | 1 | WITH ACK | 99 | 57 | 1 | WITH CQI | 89 | 85 | 1 | ACK+CQI | 82 |
| 2 | 1 | DATA ONLY | 256 | 30 | 1 | WITH ACK | 242 | 58 | 1 | WITH CQI | 222 | 86 | 1 | ACK+CQI | 209 |
| 3 | 1 | DATA ONLY | 406 | 31 | 1 | WITH ACK | 386 | 59 | 1 | WITH CQI | 356 | 87 | 1 | ACK+CQI | 336 |
| 4 | 1 | DATA ONLY | 556 | 32 | 1 | WITH ACK | 529 | 60 | 1 | WITH CQI | 489 | 88 | 1 | ACK+CQI | 462 |
| 5 | 1 | DATA ONLY | 856 | 33 | 1 | WITH ACK | 816 | 61 | 1 | WITH CQI | 756 | 89 | 1 | ACK+CQI | 716 |
| 6 | 1 | DATA ONLY | 1156 | 34 | 1 | WITH ACK | 1102 | 62 | 1 | WITH CQI | 1022 | 90 | 1 | ACK+CQI | 969 |
| 7 | 1 | DATA ONLY | 1306 | 35 | 1 | WITH ACK | 1246 | 63 | 1 | WITH CQI | 1156 | 91 | 1 | ACK+CQI | 1096 |
| 8 | 2 | DATA ONLY | 256 | 36 | 2 | WITH ACK | 249 | 64 | 2 | WITH CQI | 239 | 92 | 2 | ACK+CQI | 232 |
| 9 | 2 | DATA ONLY | 556 | 37 | 2 | WITH ACK | 542 | 65 | 2 | WITH CQI | 522 | 93 | 2 | ACK+CQI | 509 |
| 10 | 2 | DATA ONLY | 856 | 38 | 2 | WITH ACK | 836 | 66 | 2 | WITH CQI | 806 | 94 | 2 | ACK+CQI | 786 |
| 11 | 2 | DATA ONLY | 1156 | 39 | 2 | WITH ACK | 1129 | 67 | 2 | WITH CQI | 1089 | 95 | 2 | ACK+CQI | 1062 |
| 12 | 2 | DATA ONLY | 1756 | 40 | 2 | WITH ACK | 1716 | 68 | 2 | WITH CQI | 1656 | 96 | 2 | ACK+CQI | 1616 |
| 13 | 2 | DATA ONLY | 2356 | 41 | 2 | WITH ACK | 2302 | 69 | 2 | WITH CQI | 2222 | 97 | 2 | ACK+CQI | 2169 |
| 14 | 2 | DATA ONLY | 2656 | 42 | 2 | WITH ACK | 2596 | 70 | 2 | WITH CQI | 2506 | 98 | 2 | ACK+CQI | 2446 |
| 15 | 3 | DATA ONLY | 406 | 43 | 3 | WITH ACK | 399 | 71 | 3 | WITH CQI | 389 | 99 | 3 | ACK+CQI | 382 |
| 16 | 3 | DATA ONLY | 856 | 44 | 3 | WITH ACK | 842 | 72 | 3 | WITH CQI | 822 | 100 | 3 | ACK+CQI | 809 |
| 17 | 3 | DATA ONLY | 1306 | 45 | 3 | WITH ACK | 1286 | 73 | 3 | WITH CQI | 1256 | 101 | 3 | ACK+CQI | 1236 |
| 18 | 3 | DATA ONLY | 1756 | 46 | 3 | WITH ACK | 1729 | 74 | 3 | WITH CQI | 1689 | 102 | 3 | ACK+CQI | 1662 |
| 19 | 3 | DATA ONLY | 2656 | 47 | 3 | WITH ACK | 2616 | 75 | 3 | WITH CQI | 2556 | 103 | 3 | ACK+CQI | 2516 |
| 20 | 3 | DATA ONLY | 3556 | 48 | 3 | WITH ACK | 3502 | 76 | 3 | WITH CQI | 3422 | 104 | 3 | ACK+CQI | 3369 |
| 21 | 3 | DATA ONLY | 4006 | 49 | 3 | WITH ACK | 3946 | 77 | 3 | WITH CQI | 3856 | 105 | 3 | ACK+CQI | 3796 |
| 22 | 4 | DATA ONLY | 556 | 50 | 4 | WITH ACK | 549 | 78 | 4 | WITH CQI | 539 | 106 | 4 | ACK+CQI | 532 |
| 23 | 4 | DATA ONLY | 1156 | 51 | 4 | WITH ACK | 1142 | 79 | 4 | WITH CQI | 1122 | 107 | 4 | ACK+CQI | 1109 |
| 24 | 4 | DATA ONLY | 1756 | 52 | 4 | WITH ACK | 1736 | 80 | 4 | WITH CQI | 1706 | 108 | 4 | ACK+CQI | 1686 |
| 25 | 4 | DATA ONLY | 2356 | 53 | 4 | WITH ACK | 2329 | 81 | 4 | WITH CQI | 2289 | 109 | 4 | ACK+CQI | 2262 |
| 26 | 4 | DATA ONLY | 3556 | 54 | 4 | WITH ACK | 3516 | 82 | 4 | WITH CQI | 3456 | 110 | 4 | ACK+CQI | 3416 |
| 27 | 4 | DATA ONLY | 4756 | 55 | 4 | WITH ACK | 4702 | 83 | 4 | WITH CQI | 4622 | 111 | 4 | ACK+CQI | 4569 |
| 28 | 4 | DATA ONLY | 5356 | 56 | 4 | WITH ACK | 5296 | 84 | 4 | WITH CQI | 5206 | 112 | 4 | ACK+CQI | 5146 |

FIG.3

| NUMBER OF RB'S TO ALLOCATE | ALLOCATED BANDWIDTH | NUMBER OF SYMBOLS PER SUBFRAME ($N_{TOTAL}$) |
| --- | --- | --- |
| 1 | 1.25MHz | 450 |
| 2 | 2.50MHz | 900 |
| 3 | 3.75MHz | 1350 |
| 4 | 5.00MHz | 1800 |

FIG.5

| TF INDEX | NUMBER OF RB'S TO ALLOCATE | MODULATION SCHEME | CODING RATE | BASIC TF | | DERIVED TF | |
|---|---|---|---|---|---|---|---|
| | | | | DATA ONLY TB SIZE [BIT] | WITH ACK/NACK TB SIZE [BIT] | WITH CQI TB SIZE [BIT] | WITH ACK/NACK + CQI TB SIZE [BIT] |
| 1 | 1 | QPSK | 1/6 | 106 | 99 | 89 | 82 |
| 2 | 1 | QPSK | 1/3 | 256 | 242 | 222 | 209 |
| 3 | 1 | QPSK | 1/2 | 406 | 386 | 356 | 336 |
| 4 | 1 | 16QAM | 1/3 | 556 | 529 | 489 | 462 |
| 5 | 1 | 16QAM | 1/2 | 856 | 816 | 756 | 716 |
| 6 | 1 | 16QAM | 2/3 | 1156 | 1102 | 1022 | 969 |
| 7 | 1 | 16QAM | 3/4 | 1306 | 1246 | 1156 | 1096 |
| 8 | 2 | QPSK | 1/6 | 256 | 249 | 239 | 232 |
| 9 | 2 | QPSK | 1/3 | 556 | 542 | 522 | 509 |
| 10 | 2 | QPSK | 1/2 | 856 | 836 | 806 | 786 |
| 11 | 2 | 16QAM | 1/3 | 1156 | 1129 | 1089 | 1062 |
| 12 | 2 | 16QAM | 1/2 | 1756 | 1716 | 1656 | 1616 |
| 13 | 2 | 16QAM | 2/3 | 2356 | 2302 | 2222 | 2169 |
| 14 | 2 | 16QAM | 3/4 | 2656 | 2596 | 2506 | 2446 |
| 15 | 3 | QPSK | 1/6 | 406 | 399 | 389 | 382 |
| 16 | 3 | QPSK | 1/3 | 856 | 842 | 822 | 809 |
| 17 | 3 | QPSK | 1/2 | 1306 | 1286 | 1256 | 1236 |
| 18 | 3 | 16QAM | 1/3 | 1756 | 1729 | 1689 | 1662 |
| 19 | 3 | 16QAM | 1/2 | 2656 | 2616 | 2556 | 2516 |
| 20 | 3 | 16QAM | 2/3 | 3556 | 3502 | 3422 | 3369 |
| 21 | 3 | 16QAM | 3/4 | 4006 | 3946 | 3856 | 3796 |
| 22 | 4 | QPSK | 1/6 | 556 | 549 | 539 | 532 |
| 23 | 4 | QPSK | 1/3 | 1156 | 1142 | 1122 | 1109 |
| 24 | 4 | QPSK | 1/2 | 1756 | 1736 | 1706 | 1686 |
| 25 | 4 | 16QAM | 1/3 | 2356 | 2329 | 2289 | 2262 |
| 26 | 4 | 16QAM | 1/2 | 3556 | 3516 | 3456 | 3416 |
| 27 | 4 | 16QAM | 2/3 | 4756 | 4702 | 4622 | 4569 |
| 28 | 4 | 16QAM | 3/4 | 5356 | 5296 | 5206 | 5146 |

FIG.8

| TF INDEX | NUMBER OF RB'S TO ALLOCATE | TB SIZE [BIT] (FIXED) | MODULATION SCHEME | BASIC TF DATA ONLY CODING RATE | DERIVED TF WITH ACK/NACK CODING RATE | DERIVED TF WITH CQI CODING RATE | DERIVED TF WITH ACK/NACK + CQI CODING RATE |
|---|---|---|---|---|---|---|---|
| 1 | 1 | 106 | QPSK | 0.167 | 0.174 | 0.188 | 0.197 |
| 2 | 1 | 256 | QPSK | 0.333 | 0.349 | 0.375 | 0.395 |
| 3 | 1 | 406 | QPSK | 0.500 | 0.523 | 0.563 | 0.592 |
| 4 | 1 | 556 | 16QAM | 0.333 | 0.349 | 0.375 | 0.395 |
| 5 | 1 | 856 | 16QAM | 0.500 | 0.523 | 0.563 | 0.592 |
| 6 | 1 | 1156 | 16QAM | 0.667 | 0.698 | 0.750 | 0.789 |
| 7 | 1 | 1306 | 16QAM | 0.750 | 0.785 | 0.844 | 0.888 |
| 8 | 2 | 256 | QPSK | 0.167 | 0.170 | 0.176 | 0.181 |
| 9 | 2 | 556 | QPSK | 0.333 | 0.341 | 0.353 | 0.361 |
| 10 | 2 | 856 | QPSK | 0.500 | 0.511 | 0.529 | 0.542 |
| 11 | 2 | 1156 | 16QAM | 0.333 | 0.341 | 0.353 | 0.361 |
| 12 | 2 | 1756 | 16QAM | 0.500 | 0.511 | 0.529 | 0.542 |
| 13 | 2 | 2356 | 16QAM | 0.667 | 0.682 | 0.706 | 0.723 |
| 14 | 2 | 2656 | 16QAM | 0.750 | 0.767 | 0.794 | 0.813 |
| 15 | 3 | 406 | QPSK | 0.167 | 0.169 | 0.173 | 0.176 |
| 16 | 3 | 856 | QPSK | 0.333 | 0.338 | 0.346 | 0.352 |
| 17 | 3 | 1306 | QPSK | 0.500 | 0.508 | 0.519 | 0.527 |
| 18 | 3 | 1756 | 16QAM | 0.333 | 0.338 | 0.346 | 0.352 |
| 19 | 3 | 2656 | 16QAM | 0.500 | 0.508 | 0.519 | 0.527 |
| 20 | 3 | 3556 | 16QAM | 0.667 | 0.677 | 0.692 | 0.703 |
| 21 | 3 | 4006 | 16QAM | 0.750 | 0.761 | 0.779 | 0.791 |
| 22 | 4 | 556 | QPSK | 0.167 | 0.169 | 0.171 | 0.173 |
| 23 | 4 | 1156 | QPSK | 0.333 | 0.337 | 0.343 | 0.347 |
| 24 | 4 | 1756 | QPSK | 0.500 | 0.506 | 0.514 | 0.520 |
| 25 | 4 | 2356 | 16QAM | 0.333 | 0.337 | 0.343 | 0.347 |
| 26 | 4 | 3556 | 16QAM | 0.500 | 0.506 | 0.514 | 0.520 |
| 27 | 4 | 4756 | 16QAM | 0.667 | 0.674 | 0.686 | 0.694 |
| 28 | 4 | 5356 | 16QAM | 0.750 | 0.758 | 0.771 | 0.780 |

FIG.12

| TF INDEX | NUMBER OF RB'S TO ALLOCATE | TB SIZE [BIT] (FIXED) | CODING RATE | DERIVED TF - DATA ONLY | | DERIVED TF - WITH ACK/NACK | | BASIC TF - WITH CQI | DERIVED TF - WITH ACK/NACK | |
|---|---|---|---|---|---|---|---|---|---|---|
| | | | | MODULATION SCHEME 30 SYMBOLS | MODULATION SCHEME REMAINING SYMBOLS | MODULATION SCHEME 30 SYMBOLS | MODULATION SCHEME REMAINING SYMBOLS | MODULATION SCHEME ALL SYMBOLS | MODULATION SCHEME () SYMBOLS | MODULATION SCHEME REMAINING SYMBOLS |
| 1 | 1 | 106 | 1/6 | BPSK | QPSK | BPSK | QPSK | QPSK | 16QAM (20) | QPSK |
| 2 | 1 | 256 | 1/3 | BPSK | QPSK | BPSK | QPSK | QPSK | 16QAM (20) | QPSK |
| 3 | 1 | 406 | 1/2 | BPSK | QPSK | BPSK | QPSK | QPSK | 16QAM (20) | QPSK |
| 4 | 1 | 556 | 1/3 | QPSK | 16QAM | QPSK | 16QAM | 16QAM | 64QAM (40) | 16QAM |
| 5 | 1 | 856 | 1/2 | QPSK | 16QAM | QPSK | 16QAM | 16QAM | 64QAM (40) | 16QAM |
| 6 | 1 | 1156 | 2/3 | QPSK | 16QAM | QPSK | 16QAM | 16QAM | 64QAM (40) | 16QAM |
| 7 | 1 | 1306 | 3/4 | QPSK | 16QAM | QPSK | 16QAM | 16QAM | 64QAM (40) | 16QAM |
| 8 | 2 | 256 | 1/6 | BPSK | QPSK | BPSK | QPSK | QPSK | 16QAM (20) | QPSK |
| 9 | 2 | 556 | 1/3 | BPSK | QPSK | BPSK | QPSK | QPSK | 16QAM (20) | QPSK |
| 10 | 2 | 856 | 1/2 | BPSK | QPSK | BPSK | QPSK | QPSK | 16QAM (20) | QPSK |
| 11 | 2 | 1156 | 1/3 | QPSK | 16QAM | QPSK | 16QAM | 16QAM | 64QAM (40) | 16QAM |
| 12 | 2 | 1756 | 1/2 | QPSK | 16QAM | QPSK | 16QAM | 16QAM | 64QAM (40) | 16QAM |
| 13 | 2 | 2356 | 2/3 | QPSK | 16QAM | QPSK | 16QAM | 16QAM | 64QAM (40) | 16QAM |
| 14 | 2 | 2656 | 3/4 | QPSK | 16QAM | QPSK | 16QAM | 16QAM | 64QAM (40) | 16QAM |
| 15 | 3 | 406 | 1/6 | BPSK | QPSK | BPSK | QPSK | QPSK | 16QAM (20) | QPSK |
| 16 | 3 | 856 | 1/3 | BPSK | QPSK | BPSK | QPSK | QPSK | 16QAM (20) | QPSK |
| 17 | 3 | 1306 | 1/2 | BPSK | QPSK | BPSK | QPSK | QPSK | 16QAM (20) | QPSK |
| 18 | 3 | 1756 | 1/3 | QPSK | 16QAM | QPSK | 16QAM | 16QAM | 64QAM (40) | 16QAM |
| 19 | 3 | 2656 | 1/2 | QPSK | 16QAM | QPSK | 16QAM | 16QAM | 64QAM (40) | 16QAM |
| 20 | 3 | 3556 | 2/3 | QPSK | 16QAM | QPSK | 16QAM | 16QAM | 64QAM (40) | 16QAM |
| 21 | 3 | 4006 | 3/4 | QPSK | 16QAM | QPSK | 16QAM | 16QAM | 64QAM (40) | 16QAM |
| 22 | 4 | 556 | 1/6 | BPSK | QPSK | BPSK | QPSK | QPSK | 16QAM (20) | QPSK |
| 23 | 4 | 1156 | 1/3 | BPSK | QPSK | BPSK | QPSK | QPSK | 16QAM (20) | QPSK |
| 24 | 4 | 1756 | 1/2 | BPSK | QPSK | BPSK | QPSK | QPSK | 16QAM (20) | QPSK |
| 25 | 4 | 2356 | 1/3 | QPSK | 16QAM | QPSK | 16QAM | 16QAM | 64QAM (40) | 16QAM |
| 26 | 4 | 3556 | 1/2 | QPSK | 16QAM | QPSK | 16QAM | 16QAM | 64QAM (40) | 16QAM |
| 27 | 4 | 4756 | 2/3 | QPSK | 16QAM | QPSK | 16QAM | 16QAM | 64QAM (40) | 16QAM |
| 28 | 4 | 5356 | 3/4 | QPSK | 16QAM | QPSK | 16QAM | 16QAM | 64QAM (40) | 16QAM |

FIG.13

| TF INDEX | NUMBER OF RB'S TO ALLOCATE | MODULATION SCHEME | CODING RATE | BASIC TF DATA ONLY TB SIZE[BIT] | WITH ACK/NACK TB SIZE[BIT] | DERIVED TF WITH CQI TB SIZE[BIT] | WITH ACK/NACK + CQI TB SIZE[BIT] |
|---|---|---|---|---|---|---|---|
| 1 | 1 | QPSK | 1/6 | 106 | 99 | 89 | 82 |
| 2 | 1 | QPSK | 1/3 | 256 | 242 | 222 | 209 |
| 3 | 1 | QPSK | 1/2 | 406 | 386 | 356 | 336 |
| 4 | 1 | 16QAM | 1/3 | 529 | | 462 | |
| 5 | 1 | 16QAM | 1/2 | 816 | | 716 | |
| 6 | 1 | 16QAM | 2/3 | | 969 | | |
| 7 | 1 | 16QAM | 3/4 | | 1096 | | |
| 8 | 2 | QPSK | 1/6 | 256 | 249 | 239 | 232 |
| 9 | 2 | QPSK | 1/3 | 556 | 542 | 522 | 509 |
| 10 | 2 | QPSK | 1/2 | 856 | 836 | 806 | 786 |
| 11 | 2 | 16QAM | 1/3 | 1129 | | 1062 | |
| 12 | 2 | 16QAM | 1/2 | 1716 | | 1616 | |
| 13 | 2 | 16QAM | 2/3 | | 2169 | | |
| 14 | 2 | 16QAM | 3/4 | | 2446 | | |
| 15 | 3 | QPSK | 1/6 | 406 | 399 | 389 | 382 |
| 16 | 3 | QPSK | 1/3 | 856 | 842 | 822 | 809 |
| 17 | 3 | QPSK | 1/2 | 1306 | 1286 | 1256 | 1236 |
| 18 | 3 | 16QAM | 1/3 | 1729 | | 1662 | |
| 19 | 3 | 16QAM | 1/2 | 2616 | | 2516 | |
| 20 | 3 | 16QAM | 2/3 | | 3369 | | |
| 21 | 3 | 16QAM | 3/4 | | 3796 | | |
| 22 | 4 | QPSK | 1/6 | 556 | 549 | 539 | 532 |
| 23 | 4 | QPSK | 1/3 | 1156 | 1142 | 1122 | 1109 |
| 24 | 4 | QPSK | 1/2 | 1756 | 1736 | 1706 | 1686 |
| 25 | 4 | 16QAM | 1/3 | 2329 | | 2262 | |
| 26 | 4 | 16QAM | 1/2 | 3516 | | 3416 | |
| 27 | 4 | 16QAM | 2/3 | | 4569 | | |
| 28 | 4 | 16QAM | 3/4 | | 5146 | | |

FIG.14

| TF INDEX | FIRST TRANSMISSION PARAMETER | | | | DATA ONLY | WITH ACK/NACK | WITH CQI | WITH ACK/NACK + CQI |
|---|---|---|---|---|---|---|---|---|
| | NUMBER OF RB'S TO ALLOCATE | TB SIZE [BIT] (FIXED) | MODULATION SCHEME | CODING RATE | NUMBER OF RETRANSMISSION BITS AFTER CODING | NUMBER OF RETRANSMISSION BITS AFTER CODING | NUMBER OF RETRANSMISSION BITS AFTER CODING | NUMBER OF RETRANSMISSION BITS AFTER CODING |
| 1 | 1 | 106 | QPSK | 1/6 | 900 | 860 | 800 | 760 |
| 2 | 1 | 256 | QPSK | 1/3 | 900 | 860 | 800 | 760 |
| 3 | 1 | 406 | QPSK | 1/2 | 900 | 860 | 800 | 760 |
| 4 | 1 | 556 | 16QAM | 1/3 | 1800 | 1720 | 1600 | 1520 |
| 5 | 1 | 856 | 16QAM | 1/2 | 1800 | 1720 | 1600 | 1520 |
| 6 | 1 | 1156 | 16QAM | 2/3 | 1800 | 1720 | 1600 | 1520 |
| 7 | 1 | 1306 | 16QAM | 3/4 | 1800 | 1720 | 1600 | 1520 |
| 8 | 2 | 256 | QPSK | 1/6 | 1800 | 1760 | 1700 | 1660 |
| 9 | 2 | 556 | QPSK | 1/3 | 1800 | 1760 | 1700 | 1660 |
| 10 | 2 | 856 | QPSK | 1/2 | 1800 | 1760 | 1700 | 1660 |
| 11 | 2 | 1156 | 16QAM | 1/3 | 3600 | 3520 | 3400 | 3320 |
| 12 | 2 | 1756 | 16QAM | 1/2 | 3600 | 3520 | 3400 | 3320 |
| 13 | 2 | 2356 | 16QAM | 2/3 | 3600 | 3520 | 3400 | 3320 |
| 14 | 2 | 2656 | 16QAM | 3/4 | 3600 | 3520 | 3400 | 3320 |
| 15 | 3 | 406 | QPSK | 1/6 | 2700 | 2660 | 2600 | 2560 |
| 16 | 3 | 856 | QPSK | 1/3 | 2700 | 2660 | 2600 | 2560 |
| 17 | 3 | 1306 | QPSK | 1/2 | 2700 | 2660 | 2600 | 2560 |
| 18 | 3 | 1756 | 16QAM | 1/3 | 5400 | 5320 | 5200 | 5120 |
| 19 | 3 | 2656 | 16QAM | 1/2 | 5400 | 5320 | 5200 | 5120 |
| 20 | 3 | 3556 | 16QAM | 2/3 | 5400 | 5320 | 5200 | 5120 |
| 21 | 3 | 4006 | 16QAM | 3/4 | 5400 | 5320 | 5200 | 5120 |
| 22 | 4 | 556 | QPSK | 1/6 | 3600 | 3560 | 3500 | 3460 |
| 23 | 4 | 1156 | QPSK | 1/3 | 3600 | 3560 | 3500 | 3460 |
| 24 | 4 | 1756 | QPSK | 1/2 | 3600 | 3560 | 3500 | 3460 |
| 25 | 4 | 2356 | 16QAM | 1/3 | 7200 | 7120 | 7000 | 6920 |
| 26 | 4 | 3556 | 16QAM | 1/2 | 7200 | 7120 | 7000 | 6920 |
| 27 | 4 | 4756 | 16QAM | 2/3 | 7200 | 7120 | 7000 | 6920 |
| 28 | 4 | 5356 | 16QAM | 3/4 | 7200 | 7120 | 7000 | 6920 |

FIG.19

RADIO TRANSMISSION DEVICE AND RADIO TRANSMISSION METHOD

BACKGROUND

Technical Field

The present invention relates to a radio transmitting apparatus and radio transmission method for performing uplink band allocation through scheduling.

Description of the Related Art

The technical specification group radio access network ("TSG RAN") of the 3rd generation partnership project ("3GPP") is currently conducting studies on a next-generation mobile communication system, referred to as long term evolution ("LTE"). Working group 1 of the TSG RAN ("RAN 1") is moving forward with the standardization of LTE radio access schemes. Of these, single-carrier FDMA ("SC-FDMA") is adopted as the uplink radio access scheme for LTE.

This SC-FDMA is has a characteristic of low PAPR (Peak to Average Power Ratio), and is suitable to the uplink where transmission power of a terminal is limited. Therefore, to transmit control information of layer 1 ("L1") or layer 2 ("L2") at the timing user data is transmitted while maintaining the low PAPR characteristic of SC-FDMA, studies are underway to multiplex the control information, user data and reference signal (pilot for channel estimation) in the time domain, by the terminal.

As L1/L2 control information transmitted on the uplink, for example, downlink ACK/NACK and downlink CQI (Channel Quality Indicator) are generated independently of uplink user data transmission and depending on the presence/absence of user data transmission on the downlink. Therefore, the number and combinations of L1/L2 control information that is time-multiplexed with uplink data vary, and therefore Non-Patent Document 1 describes a study on a method for dynamically allocating symbols of control information and user data according to the L1/L2 control information to be actually time-multiplexed (hereinafter "dynamic symbol allocation"), thereby maximizing uplink frequency utilization efficiency. That is, the number of symbols of L1/L2 control information and the number of symbols allocated to user data are changed according to the content of the L1/L2 control information to be actually time-multiplexed.

Furthermore, with LTE, studies are underway to adopt adaptive scheduling in accordance with channel quality in the uplink (i.e., adaptive modulation and time-frequency scheduling according to channel conditions).

When the number of symbols allocated to user data varies depending on the presence/absence and combinations of L1/L2 control information that are time multiplexed as described in above Non-Patent Document 1, if uplink band allocation is performed through adaptive scheduling, a base station (hereinafter "BS") needs to report uplink band allocation information that is required upon transmitting data on the uplink, to a mobile station (hereinafter "MS"), which results in an increase in the amount of this information.

When the BS performs adaptive scheduling on the uplink according to channel conditions, the BS measures uplink channel quality using the reference signals transmitted from each MS and determines the bandwidth to allocate to each MS, the number of symbols (or the number of subframes formed with a plurality of symbols), and transmission parameters (including the M-ary modulation value, the coding rate of error correcting code, the spreading factor, etc.) based on the band requirement information for each MS, or, more specifically, based on the amount of data to be transmitted, transmission data rate, QoS (Quality of Service) information and so on. The BS reports the determined information (i.e., band allocation information) to each MS using a downlink control channel.

Furthermore, in the band allocation for E-DCH described in Non-Patent Document 2 and Non-Patent Document 3, a BS reports to a MS only the time slots allocated to the MS and the upper limit of transmission power, and the MS selects the coding rate, spreading factor and the number of bits of transmission data of the allocated time slots within the range of allowed transmission power, and reports the selected transmission parameters using the TB indexes (see FIG. 1) provided on a per transport block size basis (hereinafter "TB size"), so that the BS performs receiving processing.

TB size shows the number of transmission data bits before the CRC (Cyclic Redundancy Check) bits are added, and is derived from a combination of available transmission parameters. One TB size id associated with one coding rate and spreading factor. The M-ary modulation value is fixed and needs not be reported, so that, by reporting the TB size, the receiving side is able to acquire the number of information bits, the spreading factor and the coding rate.

Even when a centralized control system is assumed in which the BS determines the coding rate, spreading factor and the number of bits of transmission data, the BS is still able to control band allocation by including the TB size in band allocation information.

Non-Patent Document 1: R1-060111, Ericsson, "Uplink Control Signaling for E-UTRA," 3GPP TSG RAN1 WG1 Meeting #44, Denver, USA, Feb. 13-17, 2006

Non-Patent Document 2: 3GPP TS 25.321V6.7.0 (Annex)

Non-Patent Document 3: 3GPP TS 25.212V6.7.0 (4.3 Transport format detection)

SUMMARY

Problems to be Solved by the Invention

If dynamic symbol allocation is performed as described above, uplink frequency utilization efficiency may be improved. Nevertheless, given that the number of symbols to allocate to user data varies depending on the combinations of L1/L2 control information, and, consequently, the above-described method of reporting band allocation information will only increase the number of allocated symbols or TB size for user data in proportion to the number of combinations of control information and increase the number of indexes of band allocation information to report, that is, increase the number of bits. Hereinafter, this case will be explained more specifically.

Here, suppose QPSK and 16QAM are adopted as modulation schemes for user data and the coding rates of 1/6, 1/3, 1/2 is adopted for QPSK and 1/3, 1/2, 2/3, 3/4 for 16QAM. In this case, as shown in FIG. 2, there are twenty eight combinations of user data transmission parameters for when user data alone is transmitted (i.e., the number of RB's, modulation scheme and coding rate) and transport format indexes (TF indexes) to report as band allocation information, and these can be reported using five bits. However, if the combinations of ACK/NACK and CQI as the aforementioned user data and L1/L2 control information are taken into account, if the range of TB size that can be employed is simply expanded as in prior art, the number of TF indexes becomes 112 as shown in FIG. 3, and seven bits are required to report these, per MS.

This will increase the signaling overhead of control information (MS→BS) for demodulation that is transmitted accompanying uplink band allocation information or transmitted accompanying uplink user data as in conventional schemes, and reduce downlink and uplink throughput.

It is therefore an object of the present invention to provide a radio transmitting apparatus and radio transmission method for improving downlink and uplink throughput even when dynamic symbol allocation is performed.

Means for Solving the Problem

The radio transmitting apparatus of the present invention adopts a configuration including: a storage section that stores a table which associates with an identical index a basic transport format which is a combination of parameters such as a reference transport block size, number of resource blocks allocated, modulation scheme and coding rate and a derived transport format in which user data is rate-matched by a combination of L1/L2 control information multiplexed with the user data; a determining section that determines an uplink transport format and selects an index corresponding to the determined transport format from the table; and a transmitting section that transmits the selected.

The radio transmitting apparatus of the present invention adopts a configuration including: a determining step of determining an uplink transport format and selecting an index corresponding to the determined transport format based on a table that associates a basic transport format which is a combination of parameters such as a reference transport block size, number of resource block allocated, modulation scheme and coding rate with a derived transport format in which user data is rate-matched by a combination of L1/L2 control information multiplexed with the user data; and a transmitting step of transmitting the selected index.

Advantageous Effect of the Invention

According to the present invention, it is possible to improve the throughputs of the downlink and the uplink even when dynamic symbol allocation is performed.

BRIEF DESCRIPTION OF THE SEVERAL VIEWS OF THE DRAWINGS

FIG. 1 shows the correspondences between TB sizes and indexes;

FIG. 2 shows the correspondences between user data transmission parameters and indexes;

FIG. 3 shows the correspondences between TB sizes and indexes for when user data and L1/L2 control information are multiplexed;

FIG. 5 shows the number of data symbols per subframe with respect to the number of RB's to allocate;

FIG. 8 shows a transport format table according to embodiment 1 of the present invention;

FIG. 12 shows a transport format table according to embodiment 2 of the present invention;

FIG. 13 shows a transport format table according to embodiment 2 of the present invention;

FIG. 14 shows a transport format table according to embodiment 3 of the present invention;

FIG. 19 shows a transport format table according to embodiment 5 of the present invention.

DETAILED DISCLOSURE

Figure 4:
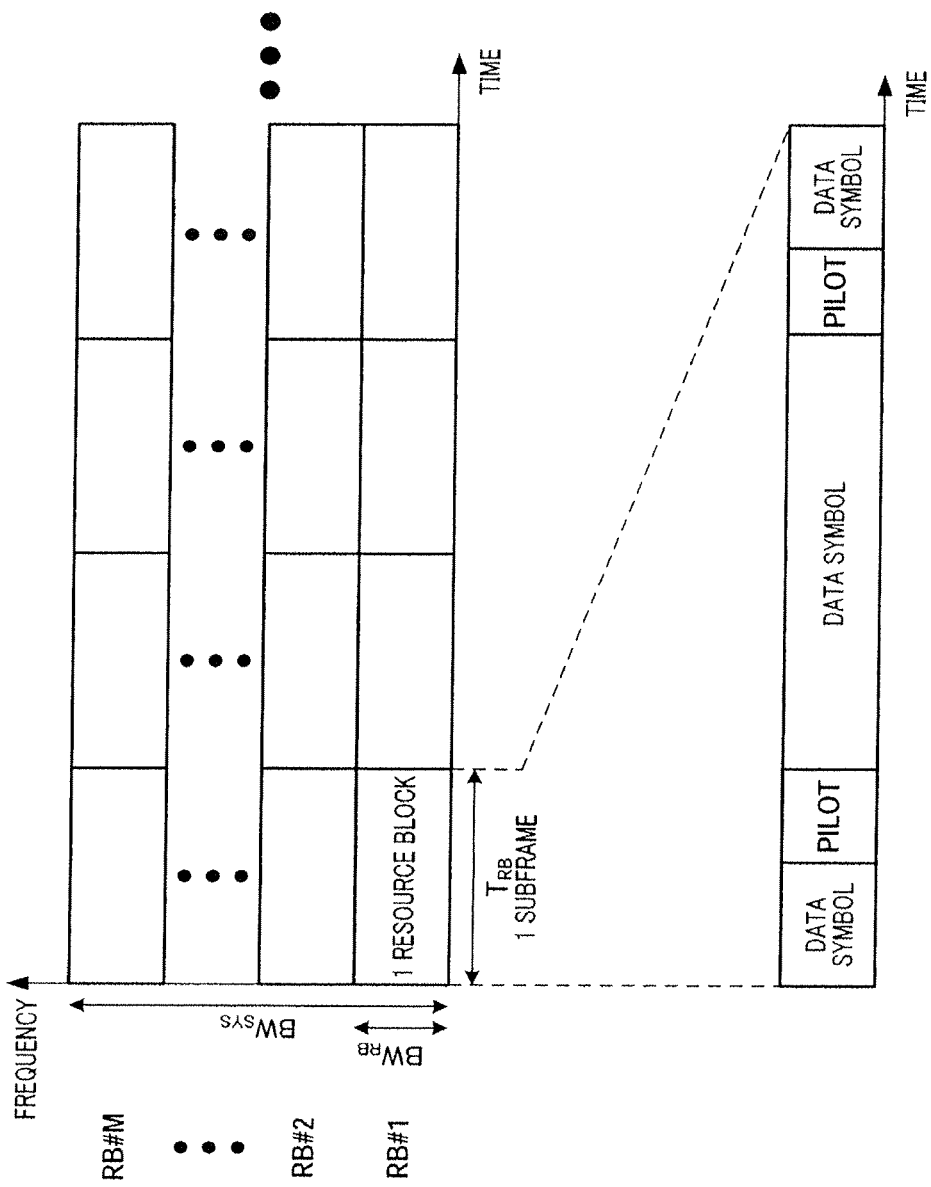
FIG. 4 shows the relationships between uplink time-frequency radio resources and their allocation units.

Now, embodiments of the present invention will be described in detail with reference to the accompanying drawings. However, components having the same functions among the embodiments are assigned the same reference numerals and overlapping explanations will be omitted.

Here, FIG. 4 shows the relationships between uplink time-frequency radio resources (UL) and their allocation units according to the present embodiment. Referring to this figure, the period of time $T_{RB}$ is defined as one subframe with respect to the time axis, and one of the M frequency bands, resulting from dividing the system bandwidth $BW_{SYS}$ into M, is defined as the bandwidth $BW_{RB}$ with respect to the frequency axis. Based on this definition, assume an SC-FDMA system where the time-frequency radio resources of period of time $T_{RB}$×bandwidth $BW_{RB}$ are the minimum unit of radio resource allocation (RB: Resource Block) that can be allocated to one MS.

One RB is formed with a data symbol part and a pilot part, and the periods of the data symbol part and the pilot part are fixed. The data symbol part is used to transmit L1/L2 control information and user data.

The following explanations assume: system bandwidth $BW_{SYS}$=5 MHz; bandwidth $BW_{RB}$ of one RB=1.25 MHz (the number of RB's on the frequency axis M=4); and one subframe length $T_{RB}$=0.5 msec. The number of RB's to allocate to one MS varies between 1 and 4 on the frequency axis and the number of data symbols $N_{TOTAL}$ per subframe corresponding to the number of RB's to allocate, is defined in FIG. 5. The values defined here are only examples and other values or other numbers of RB's to allocate, may also be adopted.

Figure 6A:
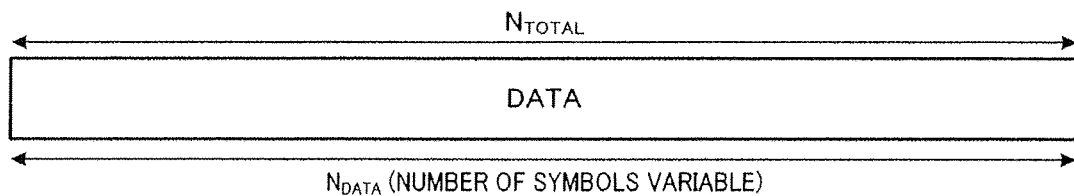
FIGS. 6A-6D show how UL user data and L1/L2 control information are multiplexed.
Figure 6B:
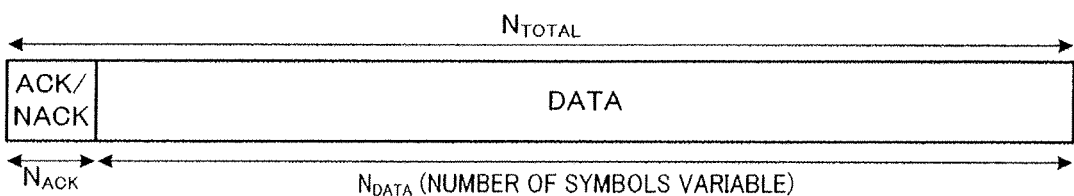
Figure 6C:
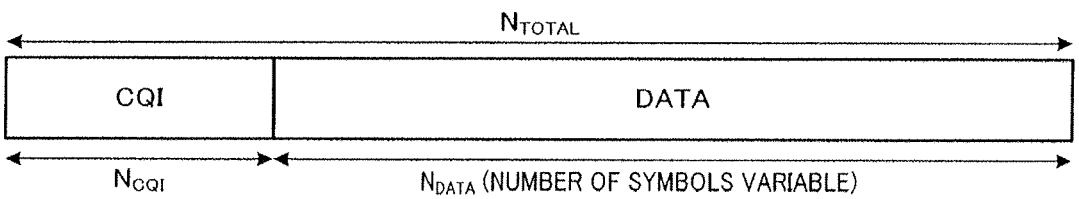
Figure 6D:
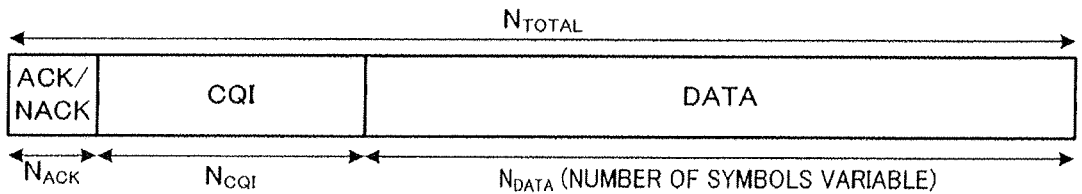

Furthermore, the present embodiment assumes a case where there are two pieces of control information, namely downlink ACK/NACK and downlink CQI, as L1/L2 control information to be multiplexed with UL user data. Therefore, when dynamic symbol allocation is performed according to the presence/absence of ACK/NACK and CQI, there are four ways of allocations as shown in FIGS. 6A-6D, and the number of symbols allocated to user data ("DATA" in the figure) $N_{DATA}$ varies depending on the combinations of control information. That is, as shown in FIG. 6A, $N_{DATA}=N_{TOTAL}$ when the data allocated to one subframe is only user data, and, as shown in FIG. 6B, $N_{DATA}=N_{TOTAL}-N_{ACK}$, when the data allocated to one subframe is user data+ACK/NACK. Furthermore, as shown in FIG. 6C, $N_{DATA}=N_{TOTAL}-N_{CQI}$, when the data allocated to one subframe is user data+CQI, and, as shown in FIG. 6D, $N_{DATA}=N_{TOTAL}-N_{ACK}-N_{CQI}$, when the data allocated to one subframe is user data+ACK/NACK+CQI.

Besides ACK/NACK and CQI, control information such as band allocation requirement information and terminal transmission power information may be also used as L1/L2 control information. Furthermore, it is possible to allocate symbols to part of L1/L2 control information on a fixed basis whether or not it is present or absent, and dynamic symbol allocation may be carried out only between other L1/L2 control information and user data.

Suppose that the number of symbols of ACK/NACK and CQI, the M-ary modulation value and coding rate are fixed and that ACK/NACK is transmitted using twenty symbols and CQI is transmitted using fifty symbols.

Suppose the user data is modulated by either QPSK and 16QAM, and, when modulated by QPSK, the user data is encoded at one of the coding rates 1/6, 1/3 and 1/2, and, when modulated by 16QAM, the user data is encoded at one of the coding rates 1/3, 1/2, 2/3 and 3/4.

Furthermore, in the present embodiment, the number of bits of the TB size shows the number of bits of transmission information before the CRC check bits are added. For the sake of calculation, the TB size is calculated for each number of symbols allocated, M-ary modulation value and coding rate, assuming that thirty two check bits are provided and twelve tail bits are added in error correction coding.

Embodiment 1

Figure 7:
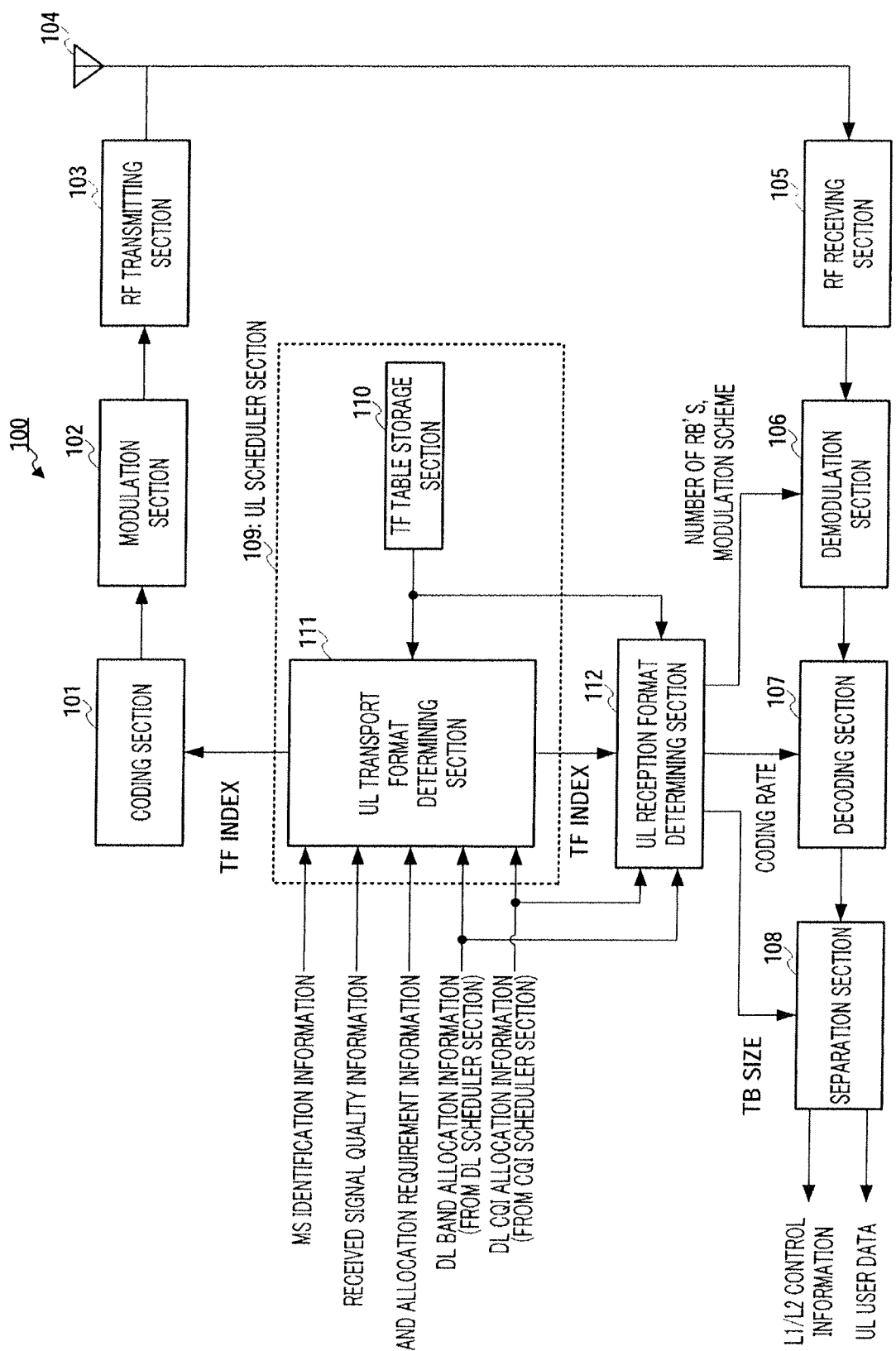
FIG. 7 is a block diagram showing a configuration of a BS according to embodiment 1 of the present invention.

FIG. 7 is a block diagram showing a configuration of BS 100 according to embodiment 1 of the present invention. In this figure, coding section 101 uses the TF indexes outputted from UL transport format determining section 111 in UL scheduler section 109 (described later) as band allocation information, applies error correcting coding to the band allocation information, and outputs the encoded data sequence to modulation section 102.

Modulation section 102 converts the coded data sequence outputted from coding section 101 to modulated symbols according to predetermined modulation schemes (QPSK, 16QAM, 64QAM and so on) and outputs the modulated signal to RF transmitting section 103.

RF transmitting section 103 up-converts the modulated signal outputted from modulation section 102 from a baseband signal to the transmitting band, and transmits the up-converted modulated signal through antenna 104.

RF receiving section 105 receives the signal transmitted from a MS via antenna 104, down-converts the received signal to a baseband signal and outputs the baseband signal to demodulation section 106.

Demodulation section 106 estimates and compensates the channel distortion of the baseband signal (received data symbol sequence) outputted from RF receiving section 105, identifies the signal points of the received data symbol sequence subjected to channel distortion compensation, through either of hard decision or soft decision suitable for the demodulation of the data, based on the number of RB's and modulation scheme outputted from UL reception format determining section 112 (described later), and outputs the signal point decision result to decoding section 107.

Decoding section 107 performs error correction processing on the signal point decision result outputted from demodulation section 106 based on the coding rate outputted from UL reception format determining section 112 and outputs the received data sequence to separation section 108.

Separation section 108 separates the received data sequence outputted from decoding section 107 into UL user data and L1/L2 control information based on the TB size outputted from UL reception format determining section 112.

UL scheduler section 109 is provided with transport format (TF) table storage section 110 and UL transport format determining section 111. TF table storage section 110 stores a table that combines the basic transport formats (hereinafter "basic TF's") and derived transport formats (hereinafter "derived TF's"). A basic TF defines the number of RB's to allocate and the TB size for when user data alone is transmitted. On the other hand, in association with a basic TF, derived TF's are set with TB sizes that vary depending on the combinations of L1/L2 control information that is transmitted at the same time with user data. That is, TF table storage section 110 stores a table in which one TF index is assigned in association with a basic TF and a plurality of derived TF's. An appropriate TF index is selected from the stored table, the selected TF index is outputted to UL transport format determining section 111 and the parameters corresponding to the TF index are outputted to UL reception format determining section 112. Details of the TF table will be described later.

UL transport format determining section 111 determines the number of RB's required for the allocation and transmission parameters, from MS identification information (or "UE-ID"), received signal quality information at the MS matching the MS identifier, band allocation requirement information (the amount of data, transmission rate and so on), DL band allocation information outputted from a DL scheduler section (not shown) and DL CQI allocation information outputted from a CQI scheduler section (not shown), selects the corresponding TF index from TF table storage section 110, and outputs the selected TF index to coding section 101 and UL reception format determining section 112.

UL reception format determining section 112 acquires the corresponding transmission parameters from TF table storage section 110 based on DL band allocation information outputted from a DL scheduler section (not shown), DL CQI allocation information outputted from a CQI scheduler section (not shown) and the TF index outputted from UL transport format determining section 111, determines the reception format for the UL user data transmitted from a MS on the uplink and determines the reception parameters required for the demodulation, such as the TB size, coding rate, the number of RB's and modulation scheme. The determined number of RB's and modulation scheme are outputted to demodulation section 106, the coding rate is outputted to decoding section 107 and the TB size is outputted to separation section 108.

Next, details of above described TF table storage section 110 will be explained. The TF table is defined in advance as shown in FIG. 8. This TF table is stored as a table known to a BS and MS.

This TF table provides combinations of two types of TF's, namely the basic TF's and derived TF's, and the basic TF's are assigned TF indexes. The basic TF's define, for example, the number of RB's to allocate, TB size, modulation scheme and coding rate for when user data alone is transmitted, as shown in FIG. 8.

On the other hand, in association with a basic TF, derived TF's define TB sizes that vary depending on the combinations of L1/L2 control information to be transmitted at the same time with the user data. That is, derived TF's are provided such that only the number of symbols to be assigned to user data varies, and, as for the other transmission parameters including the M-ary modulation value and coding rate, the same parameters are associated with the same TF index as the basic TF.

In other words, a table is provide in which, in association with basic TF's, derived TF's are provided such that the rate matching by the number of symbols, which decreases and increases depending on whether or not there is L1/L2 control information (and which decreases in FIG. 8), is controlled by TB size.

Figure 9:
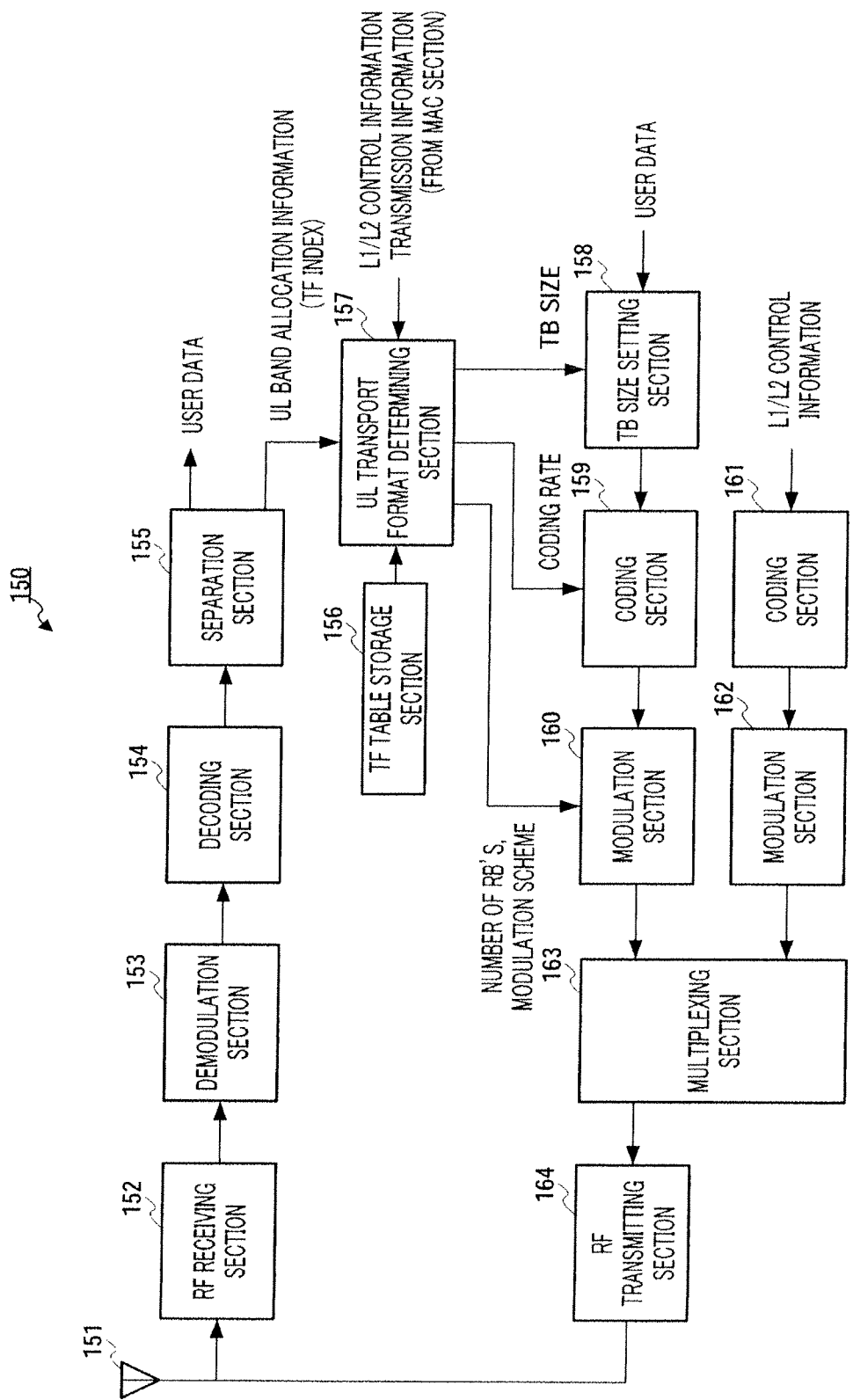
FIG. 9 is a block diagram showing a configuration of a MS according to embodiment 1 of the present invention.

FIG. 9 is a block diagram showing a configuration of MS 150 according to embodiment 1 of the present invention. In this figure, RF receiving section 152 receives a signal transmitted from BS 100 via antenna 151, down-converts the received signal to a baseband signal and outputs the baseband signal to demodulation section 153.

Demodulation section 153 estimates and compensates the channel distortion of the baseband signal (received data symbol sequence) outputted from RF receiving section 152, identifies the signal points of the received data symbol sequence subjected to channel distortion compensation through either hard decision or soft decision suitable for the modulation of the data, based on the modulation scheme, and outputs the signal point decision result to decoding section 154.

Decoding section 154 performs error correction processing on the signal point decision result outputted from demodulation section 153 and outputs the received data sequence to separation section 155.

Separation section 155 separates the received data sequence outputted from decoding section 154 into user data and UL band allocation information (TF index), and outputs the separated UL band allocation information to UL transport format determining section 157.

TF table storage section 156 stores the same table as the TF table of BS 100 and UL transport format determining section 157 reads the parameters associated with the TF index, from the stored table.

UL transport format determining section 157 acquires the TF index outputted from separation section 155 as UL band allocation information, determines a TB size from the TF table based on L1/L2 control information transmission information indicating the presence/absence of L1/L2 control information outputted from a MAC section (not shown), and outputs the determined TB size to TB size setting section 158. Furthermore, UL transport format determining section 157 reads the parameters associated with the TF index from the TF table, and outputs the coding rate out of the read parameters to coding section 159 and the number of RB's and modulation scheme to modulation section 160.

TB size setting section 158 sets the TB size of user data to be transmitted according to the TB size outputted from UL transport format determining section 157, adds the CRC bits (here, thirty two bits) to the user data for which the TB size is set, and outputs the user data to coding section 159.

Coding section 159 adds tail bits and applies error correcting coding to the user data outputted from TB size setting section 158, using the coding rate outputted from UL transport format determining section 157, and outputs the coded data sequence to modulation section 160.

Modulation section 160 converts the coded data sequence outputted from coding section 159 to modulated symbols, based on the number of RB's and modulation scheme (QPSK, 16QAM, 64QAM and so on) outputted from UL transport format determining section 157, and outputs the modulated signal to multiplexing section 163.

Coding section 161 applies error correcting coding to L1/L2 control information at a predetermined coding rate, and outputs the coded data sequence to modulation section 162. Modulation section 162 converts the coded data sequence outputted from coding section 161 to modulated symbols according to a predetermined modulation scheme and outputs the modulated signal to multiplexing section 163.

Multiplexing section 163 multiplexes the user data outputted from modulation section 160 and the L1/L2 control information outputted from modulation section 162, and outputs the multiplexed signal to RF transmitting section 164.

RF transmitting section 164 up-converts the multiplexed signal outputted from multiplexing section 163 from a baseband signal to a transmitting band, and transmits the up-converted multiplexed signal from antenna 151.

Next, the steps of communication between above described BS 100 and MS 150 will be explained using FIG. 10. Here, a case where ACK/NACK is multiplexed with user data as L1/L2 control information, will be explained by way of an example.

Figure 10:
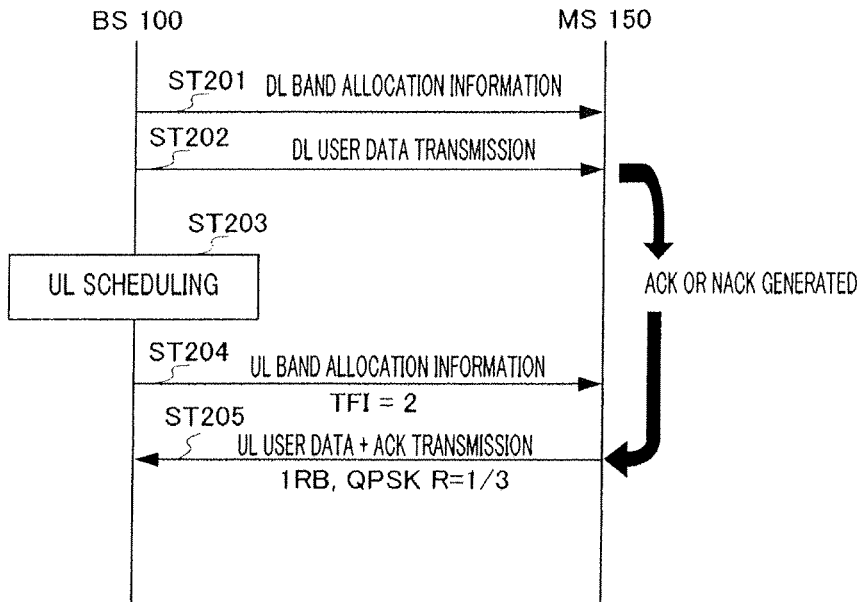
FIG. 10 is a sequence diagram showing the steps of communication between the BS and MS.

In FIG. 10, in ST201, BS 100 performs DL scheduling for MS 150, transmits DL band allocation information to MS 150, and, in ST202, BS 100 transmits DL user data to MS 150.

In this case, in ST203, several TTI's (Transmission Time Intervals) after user data is transmitted on the downlink to MS 150, for which UL band allocation is performed, BS 100 performs UL scheduling for MS 150. In this case, the scheduler determines appropriate transmission parameters and the number of RB's to allocate based on band requirement information (the amount of data, transmission rate and so on) from MS 150, UL CQI information of target MS 150, information about the presence/absence or the type of L1/L2 control information multiplexed with the user data on the uplink and selects the TF index (=TFI) associated with the TB size from the number of RB's to allocate, transmission parameters, L1/L2 control information to be multiplexed, determined from the TF table in FIG. 8 as band allocation information. Here, suppose TB size=242 bits is allocated and TFI=2 is selected as band allocation information.

In ST204, UL band allocation information (TFI=2) is reported to target MS 150 over the downlink.

In ST205, MS 150, which has received UL band allocation information acquires the number of RB's to allocate and the TB size of the basic TF, from the demodulated TF index. Furthermore, in a subframe in which UL user data is transmitted, MS 150 selects a TB size from the table shown in FIG. 8, according to the presence/absence and combinations of DL ACK/NACK or DL CQI transmission to be transmitted at the same time, performs coding and modulation of the transmission data of the TB size using the transmission parameters associated with the acquired TFI, time multiplexes necessary L1/L2 control information and then carries out uplink transmission.

Here, because DL ACK transmission is transmitted here, TB size=242 is selected and user data is subjected to transmission processing using QPSK and R=1/3 as the applicable modulation parameters.

Furthermore, since the same BS 100 performs the downlink band allocation as well, when performing UL scheduling, if MS 150 receives DL band allocation information correctly, BS 100 knows in advance that DL ACK/NACK are multiplexed upon the same time and only reports the TFI of the basic TF, and, in many cases, MS 150 also performs UL transmission in the TB size intended by BS 100.

Figure 11:
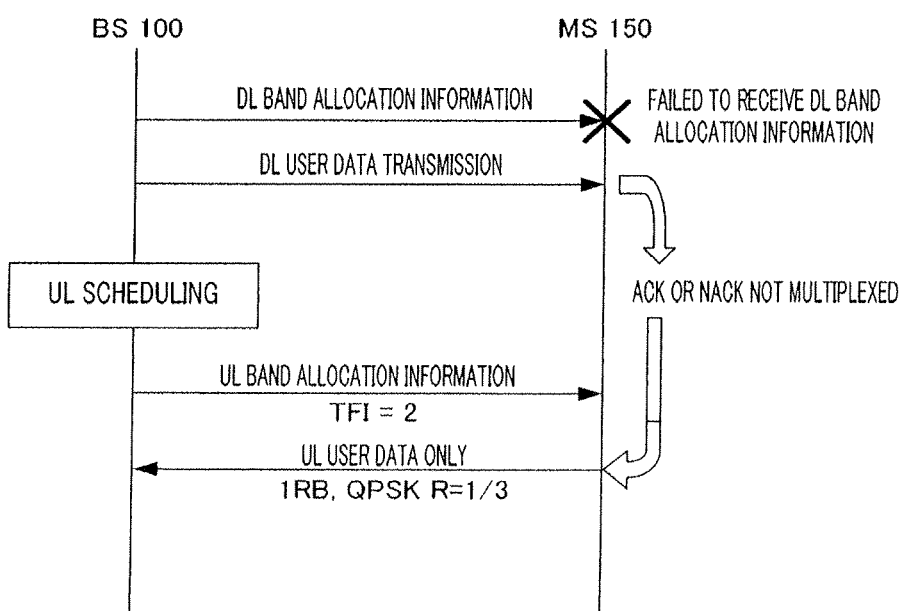
FIG. 11 is a sequence diagram showing a case where the MS fails to receive DL band allocation information in the steps of communication between the BS and MS.

Now, BS 100 demodulates the UL user data, and there can be various cases, including, for example, a case where MS 150 fails to receive DL band allocation information (FIG. 11) and a case where a DL CQI is reported under the initiative of the MS. In such a case, MS 150 performs transmission processing on the UL user data using a value different from the TB size intended by BS 100 upon scheduling.

Therefore, BS 100 performs blind estimation within the range of TB size corresponding to the TFI reported in the band allocation information or performs demodulation by receiving information indicating the combination of L1/L2 control information from the MS. Even when different L1/L2 control information is multiplexed, the TB size which MS 150 can select is determined in advance in the TF table shown in FIG. 8, so that it is possible to reduce the amount of processing for performing blind estimation.

In this way, embodiment 1 associates, with same index, basic TF's, which refers to combinations of parameters such as TB size, the number of RB's to allocate, modulation scheme and coding rate for when user data alone is transmitted, and derived TF's, which have varying TB sizes for user data depending on the combinations of L1/L2 control information, so that, when dynamic symbol allocation is performed in the uplink, transport format can be reported by only reporting the indexes, thereby reducing the number of TF bits of scheduling information and improving frequency utilization efficiency of the uplink without increasing the overhead of control information. Furthermore, rate matching is controlled by adjusting the number of information bits to transmit, so that, even when control information is multiplexed upon the same time, the coding rate and modulation scheme need not be changed, and, consequently, the packet error rate is maintained effectively.

A case where ACK/NACK is multiplexed has been explained, but the same applies to cases where other kinds of L1/L2 control information are multiplexed.

Embodiment 2

The configurations of a BS and MS according to embodiment 2 of the present invention are similar to those shown in FIG. 7 and FIG. 9 of embodiment 1, respectively, and therefore FIG. 7 and FIG. 9 will be used and overlapping explanations will be omitted.

FIG. 12 shows a TF table according to embodiment 2 of the present invention. Here, a setup is employed in which the basic TF's are combinations of the number of RB's to allocate, TB size, modulation scheme and coding rate for when user data alone is transmitted, and in which derived TF's have coding rates for user data that vary depending on the combinations of L1/L2 control information. That is, parameters such as the number of RB's to allocate, TB size and modulation scheme do not change depending on the combinations of L1/L2 control information.

Adjustment of the coding rate may also be realized by changing the number of output bits of error correcting code represented by turbo code, convolutional code and LDPC code, and the bit puncturing pattern when puncturing the error correcting coding output. Furthermore, the coding rate may be adjusted also by changing some of the output bits of error correcting coding or the number of all bit repetitions or number of symbol repetitions. Moreover, these methods may be adopted in various combinations.

However, when only some of the symbols are repeated, the positions of the symbols to be repeated, are also shared in advance between the BS and MS in a TF table.

In this way, according to embodiment 2, even when user data coding rates varying depending on the combinations of L1/L2 control information are set in the derived TF's, the number of bits for transport format for scheduling information can be reduced, so that uplink frequency utilization efficiency is improved without increasing overhead for control information. Furthermore, rate matching is controlled by changing the coding rate, so that, even when control information is multiplexed upon the same time, the number of information bits to be transmitted does not change and the transmission data rate (i.e., transmission rate) is effectively maintained.

As shown in FIG. 13, the derived TF's may be provided with M-ary modulation values, so that, whether or not L1/L2 control information is multiplexed, adequate support is provided by changing the M-ary modulation value with respect to some or all of the symbols transmitted. Furthermore, a setup is also possible in which the basic TF's are used when CQI is transmitted. However, the combination of L1/L2 control information to be set in association with a basic TF may be any of all combinations, and may be, preferably, the most frequently occurring combination or a combination that reduces the difference in the reception performance between the basic TF's and derived TF's.

However, when a setup is employed in which the modulation the M-ary modulation value is changed for only part of the symbols, the positions of symbols whose modulation the M-ary modulation value is changed are also shared in advance between the BS and MS as a TF table.

Embodiment 3

Configurations of a BS and MS according to embodiment 3 of the present invention are similar to the configurations shown in FIG. 7 and FIG. 9 of embodiment 1, and therefore FIG. 7 and FIG. 9 will be used and overlapping explanations will be omitted.

FIG. 14 shows a TF table according to embodiment 3 of the present invention. Here, unlike the table shown in FIG. 8, TB sizes that are associated with combinations of L1/L2 control information on a one to one basis, are not provided with respect to all TF indexes. Instead, one TB size is set for several combinations of L1/L2 control information. That is, rate matching of user data is controlled in equal proportions between the combinations of L1/L2 control information.

Especially, TF indexes using modulation schemes of low transmission rates and coding rates show lower frequency utilization efficiency than TF indexes of higher transmission rates, so that radio resource utilization efficiency can be improved by providing more associations with L1/L2 control information.

In this way, according to embodiment 3, the number of derived TF's that will have little frequency utilization efficiency improvement effect even if rate adjustment is carried out according to the presence/absence of L1/L2 control information to be multiplexed, the complexity of the transmitter/receiver necessitated by rate matching, can be reduced.

Parameters for controlling rate matching between combinations of L1/L2 control information are not limited to TB size and so on as described in embodiment 2, and other parameters such as the coding rate, modulation scheme and the number of RB's to allocate, may be adopted as well. Furthermore, the number of derived TF's for a TF index is not limited to the number shown in FIG. 14 and may also be set in accordance with the capacity of the BS and MS.

Embodiment 4

Embodiment 4 of the present invention will be explained assuming a case where scheduling is realized by switching between channel dependent scheduling/adaptive scheduling (adaptive time-frequency scheduling according to channel quality, hereinafter simply "adaptive scheduling") and persistent scheduling/static scheduling.

Adaptive scheduling performs adaptive modulation, adaptive band allocation and adaptive bandwidth allocation according to uplink channel quality and the amount of data required. Furthermore, band allocation information is reported to the MS on the downlink for every band allocation (that is, every scheduling). Examples of adopting adaptive scheduling include application to a MS which moves relatively slowly and to which band of high reception quality and optimal transmission parameters can be assigned every allocation according to instantaneous fluctuation of channel quality, or application to services whose transmission data is generated not regularly but in bursts.

On the other hand, persistent scheduling allocates the modulation scheme, coding rate, bandwidth and the number of slots, according to uplink channel quality and the amount of data required, and reports band allocation information on the downlink only upon the first band allocation. In the second to k-th band allocations, band allocation is performed using predetermined periods and frequency hopping patterns, and therefore uplink user data transmission is performed without reporting band allocation information on the downlink (k shows the number of times fixed allocation determined by the system is performed). Examples of application of persistent scheduling include application to constant bit rate services in which transmission data is generated regularly (e.g., VoIP, video streaming, Internet games, etc.) and application to scheduling for a MS which moves fast and which is therefore not suitable for adaptive scheduling.

Figure 15:
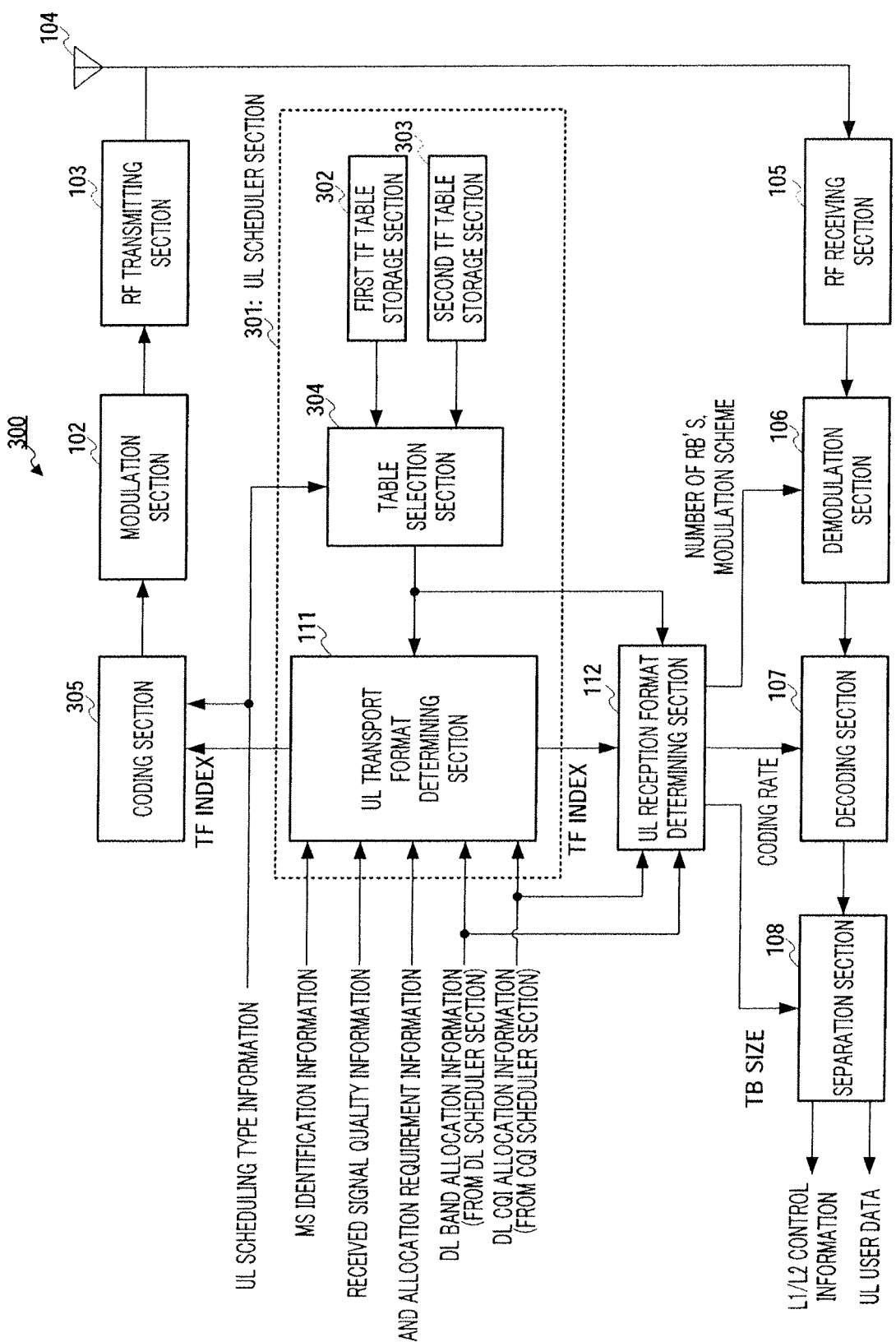
FIG. 15 is a block diagram showing a configuration of a BS according to embodiment 4 of the present invention.

FIG. 15 is a block diagram showing a configuration of BS 300 according to embodiment 4 of the present invention. FIG. 15 differs from FIG. 7 in that a plurality of TF table storage sections 302 and 303 and table selection section 304 are added and coding section 101 is changed to coding section 305.

In FIG. 15, UL scheduler section 301 is provided with first TF table storage section 302, second TF table storage section 303, table selection section 304 and UL transport format determining section 111.

First TF table storage section 302 stores the TF table shown in FIG. 8 and second TF table storage section 303 stores the TF table shown in FIG. 12.

Table selection section 304 acquires UL scheduling type information showing whether to apply adaptive scheduling or persistent scheduling to a given MS, and selects the table to employ in the band allocation according to the UL scheduling type information. The selected TF table is used in UL transport format determining section 111 upon band allocation and used in UL reception format determining section 112 when UL data is received.

More specifically, table selection section 304 adopts a table in which TB size is set in derived TF's (i.e. the TF table shown in FIG. 8), to a MS subject to adaptive scheduling, for maximum frequency utilization efficiency.

On the other hand, to a MS subject to persistent scheduling, a table, in which physical layer parameters such as the coding rate, modulation scheme and the number of repetitions, are set in the derived TF's (i.e. the TF table shown in FIG. 12, for example), is applied. This is because, if a MS is subject to persistent scheduling, its transmission band does not increase or decrease for a certain period, so that it is possible to transmit every time the data to be transmitted by using derived TF's, between which rate matching is controlled based on the coding rate, modulation scheme, the number of repetitions and so on, without changing the TB size, and reduce communication delays and jitter.

In persistent scheduling, band allocation information is transmitted only upon the first transmission and band allocation information is generally not transmitted upon the second to K-th band allocations for UL user data.

Coding section 305 applies error correcting coding to UL scheduling type information in addition to the TF index as band allocation information outputted from UL transport format determining section 111, and outputs the coded data sequence to modulation section 102.

Figure 16:
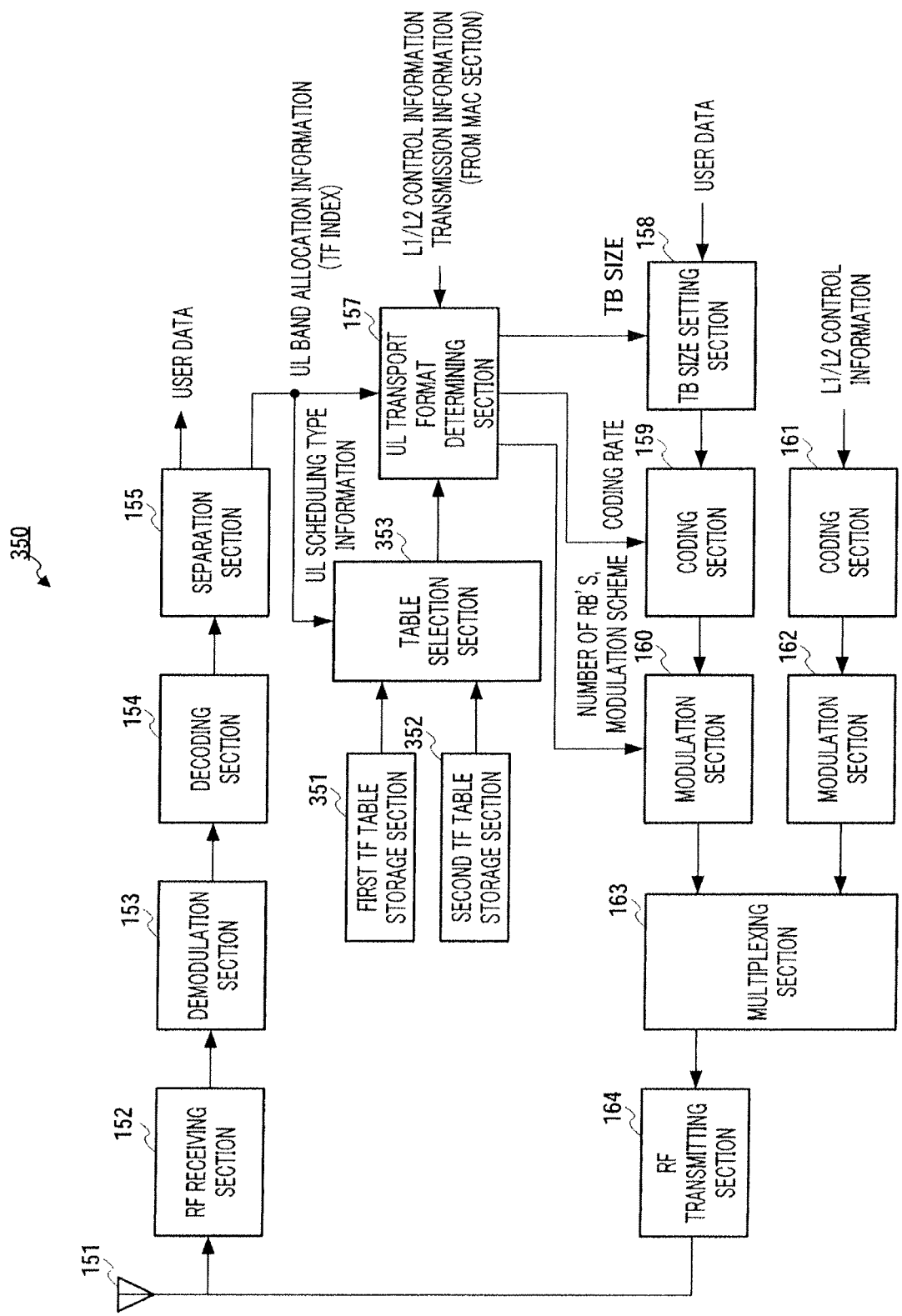
FIG. 16 is a block diagram showing a configuration of a MS according to embodiment 4 of the present invention.

FIG. 16 is a block diagram showing a configuration of MS 350 according to embodiment 4 of the present invention. FIG. 16 differs from FIG. 9 in that a plurality of TF table storage sections 351 and 352 and table selection section 353 are added.

In FIG. 16, first TF table storage section 351 stores the TF table shown in FIG. 8 and second TF table storage section 352 stores the TF table shown in FIG. 12.

Table selection section 353 acquires UL scheduling type information outputted from separation section 155, and selects the table to employ in the band allocation according to the UL scheduling type information. The selected TF table is used in UL transport format determining section 157 upon band allocation.

In this way, according to embodiment 4, if a MS is subject to persistent scheduling, the transmission band does not increase or decrease for a certain period, so that the data to be transmitted is reliably transmitted every time and communication delay and jitter are reduced by controlling the rate matching without changing the TB size. On the other hand, a MS that is subject to adaptive scheduling is controlled using the latest CQI upon every band allocation, so that frequency utilization efficiency can be improved by controlling rate matching according to TB size.

The present embodiment has been explained with reference to a case where two TF tables are switched, but the present invention is not limited to this, and more TF tables may be switched.

Embodiment 5

Embodiment 5 of the present invention will explain a case assuming a system adopting HARQ (Hybrid Automatic Repeat reQuest) based on the IR (Incremental redundancy) scheme.

Figure 17:
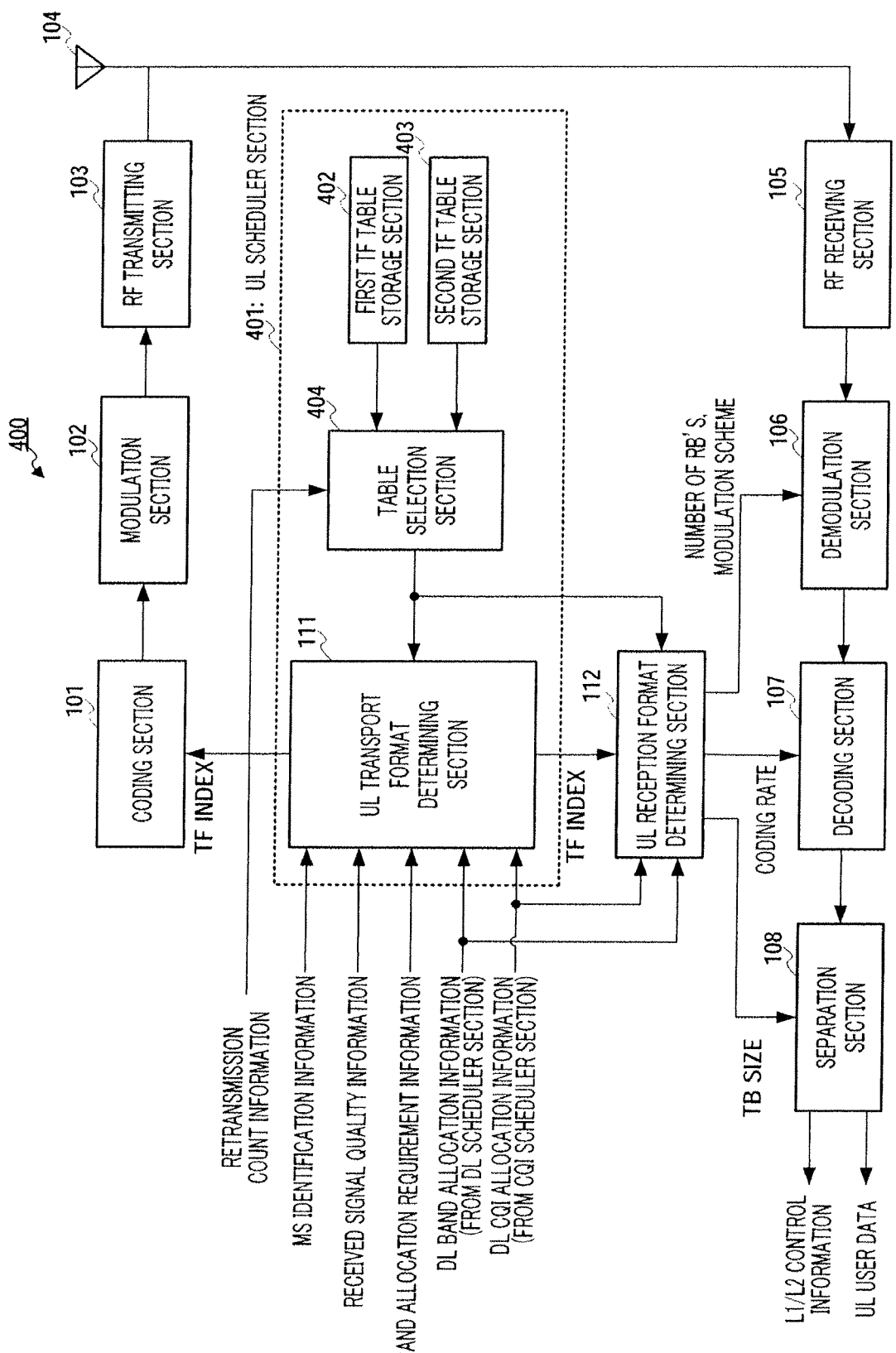
FIG. 17 is a block diagram showing a configuration of a BS according to embodiment 5 of the present invention.

FIG. 17 is a block diagram showing a configuration of BS 400 according to embodiment 5 of the present invention. FIG. 17 differs from FIG. 7 in that a plurality of TF table storage sections 402 and 403 and table selection section 404 are added.

In FIG. 17, UL scheduler section 401 is provided with first TF table storage section 402, second TF table storage section 403, table selection section 404 and UL transport format determining section 111.

First, TF table storage section 402 stores the first table shown in FIG. 8, FIG. 12, FIG. 13, FIG. 14 and so on, and second TF table storage section 403 stores a second table in which derived TF's are provided with different number of retransmission bits depending on the combinations of L1/L2 control information.

Table selection section 404 acquires retransmission count information and selects the table to employ in band allocation according to the count of UL user data retransmissions. More specifically, table selection section 404 selects the first table for a MS for the first transmission (i.e. retransmission count=0) and selects a second table for a MS having a retransmission count of one or more. The selected TF table is used in UL transport format determining section 111 upon band allocation and used in UL reception format determining section 112 when UL data is received.

Figure 18:
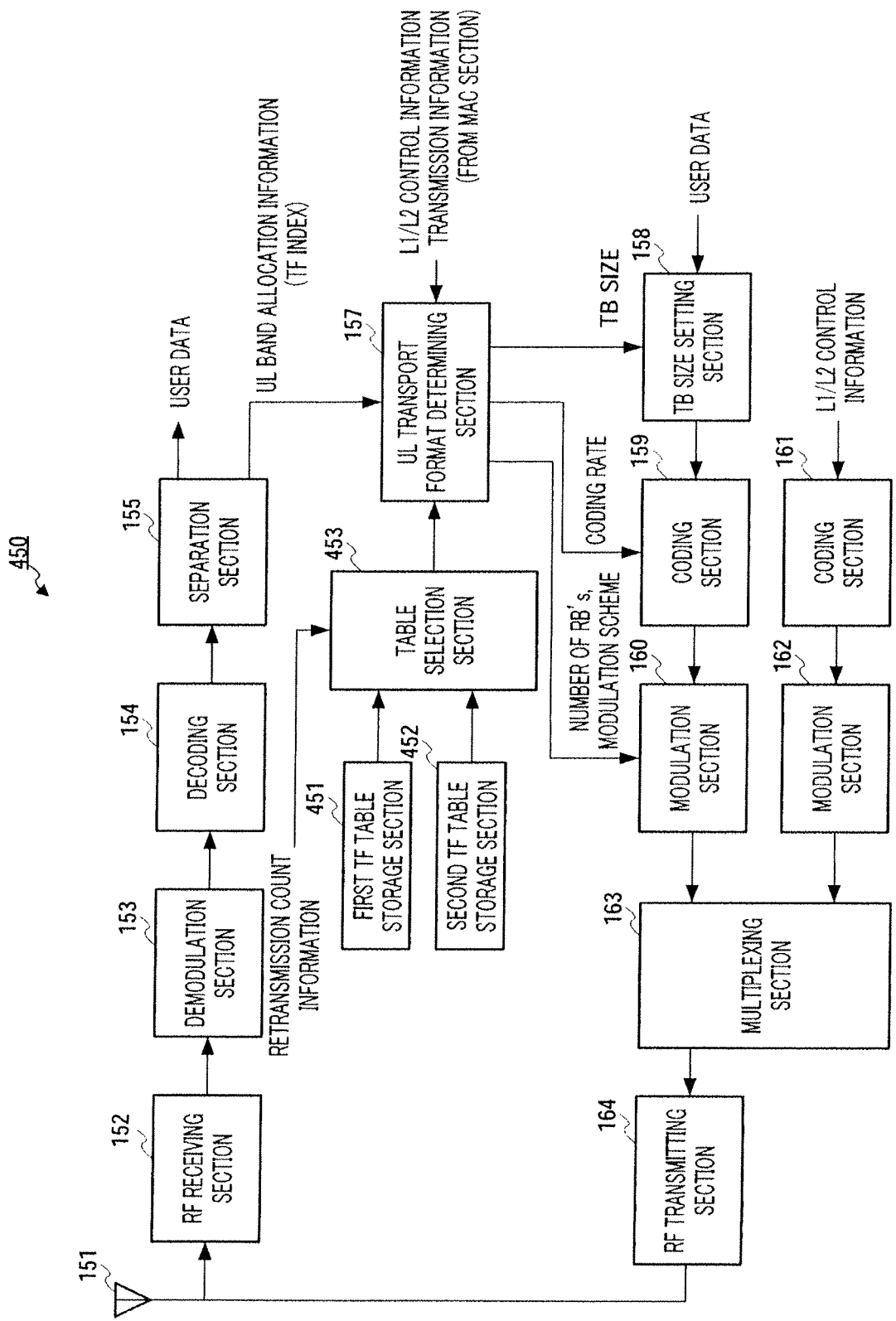
FIG. 18 is a block diagram showing a configuration of a MS according to embodiment 5 of the present invention.

FIG. 18 is a block diagram showing a configuration of MS 450 according to embodiment 5 of the present invention. FIG. 18 differs from FIG. 9 in that a plurality of TF table storage sections 451 and 452 and table selection section 453 are added.

In FIG. 18, first TF table storage section 451 stores the first table shown in FIG. 8, FIG. 12, FIG. 13, FIG. 14 and so on, and second TF table storage section 452 stores a second table in which the number of bits transmitted upon retransmission is set in derived TF's according to the combinations of L1/L2 control information.

Table selection section 453 acquires retransmission count information and selects a table to be applied to band allocation according to the count of UL user data retransmissions. The count of retransmissions is determined by counting the number of times NACK is reported from the BS for the same UL user data transmission packet.

FIG. 19 shows a TF table according to embodiment 5 of the present invention. As described above, the derived TF's are provided such that the number of retransmission bits varies depending on the combinations of L1/L2 control information. When the number of retransmission bits varies between retransmissions, for example, more specifically, the following adjustment may be carried out.

Figure 20:
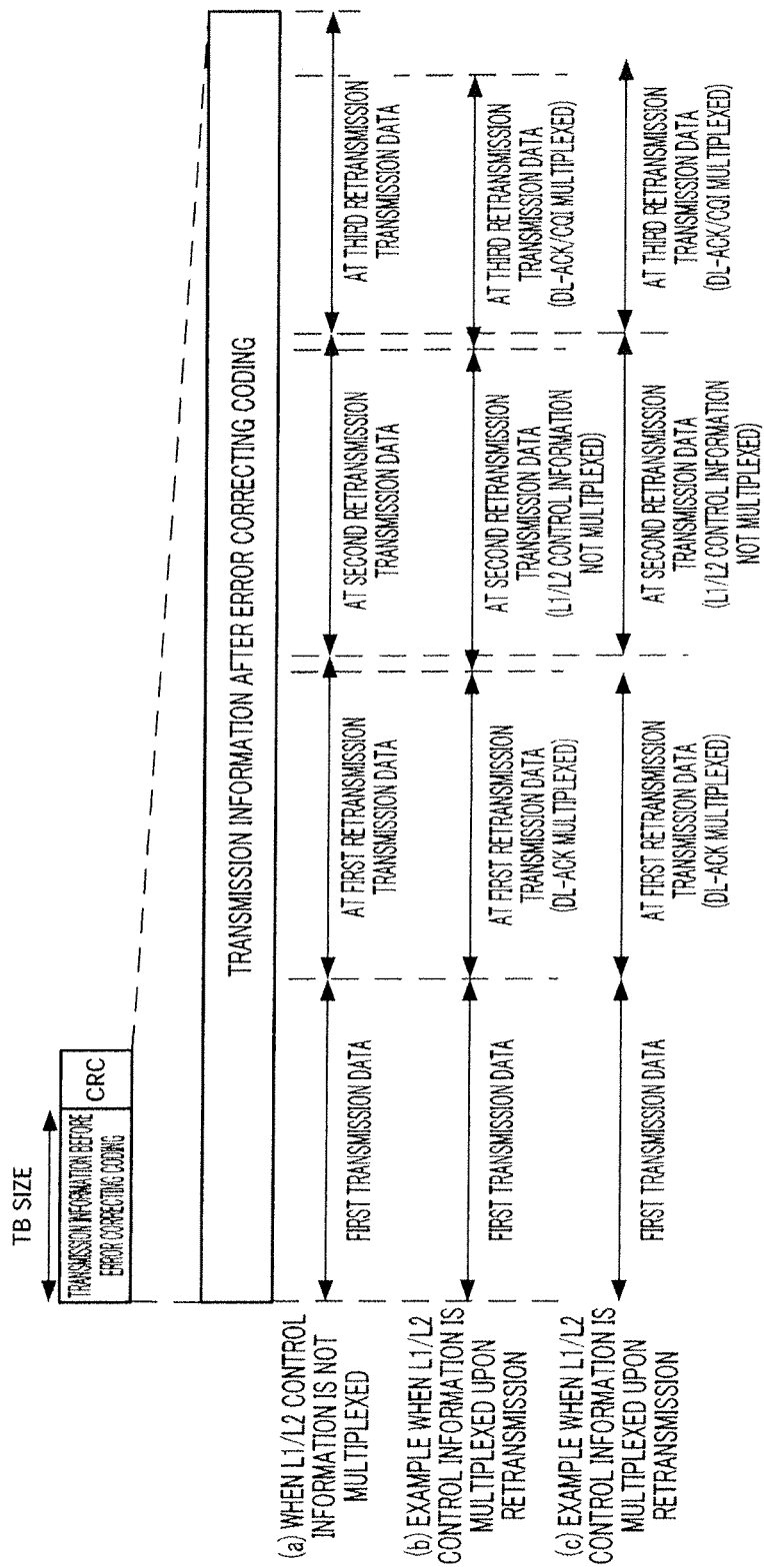
FIG. 20 shows a method of adjusting the number of retransmission bits for when L1/L2 control information is multiplexed.

The present embodiment assumes an IR-based HARQ system, and, in this system, redundant transmission bits are added every time a retransmission occurs, as shown in FIG. 20, and therefore the number of redundant bits to be retransmitted is adjusted according to the presence/absence or combinations of L1/L2 control information. Therefore, the number of redundant bits to be transmitted is lower when there is L1/L2 control information, than in a case where there is no L1/L2 control information (FIG. 20(*a*)). As for the location the redundant bits to be transmitted upon a retransmission starts being transmitted, the retransmission may be started from the next redundant bit from the previous transmission, as shown in FIG. 20(*b*). Alternatively, as shown in FIG. 20(*c*), retransmission may be performed from the bit position where transmission takes place when L1/L2 control information is not multiplexed. The position the redundant bits start being transmitted, may be shared in advance between the BS and MS.

In this way, according to embodiment 5, the rate matching between retransmissions is controlled by adjusting the number of redundant bits to be retransmitted and the redundant bit selection pattern, so that, even when L1/L2 control information is multiplexed upon retransmission, redundant bits can be transmitted effectively. Embodiment 5 is especially effective in synchronous HARQ where UL band allocation information is not reported on the downlink upon retransmissions.

The present embodiment has explained the details of adjustment for when the number of retransmission bits varies upon retransmission assuming a HARQ system based on the IR scheme, and adjustment for HARQ applied to the HSDPA (High Speed Downlink Packet Access) system described in Non-Patent Document 3, is as follows. That is, the rate matching and transmission bits upon retransmission are determined by the parameter "s" and parameter "r" of the RV (Redundancy Version) variable, which is reported in band allocation information.

When s=0, the parameter "s" is a mode in which systematic bits are preferentially retransmitted, so that systematic bits are selected as the bits to be retransmitted with reference to the number of retransmission bits shown in the TF table, and parity bits are further transmitted when there are a sufficient number of retransmission bits.

On the other hand, when s=1, parameter s is a mode in which parity bits are preferentially retransmitted, so that parity bits are selected as bits to be retransmitted with respect to the number of retransmission bits shown in the TF table and systematic bits are further transmitted if there are a sufficient number of retransmission bits.

Parameter r is a parameter indicating the retransmission count and determines the position at which bit puncturing is started.

When the number of bits retransmitted increases or decreases depending on the combinations of L1/L2 control information, such a HARQ system increases or decreases the number of the bits that are not given priority instead of the bits that are given priority upon retransmission. That is, when s=0, the number of parity bits is decreased or increased to match with the number of retransmission bits. On the other hand, when s=1, the number of systematic bits is decreased or increased to match with the number of retransmission bits.

Furthermore, a case has been explained with the present embodiment where two TF tables are switched, but the present invention is not limited to this and may also be adapted to switch more tables. Furthermore, the TF table upon retransmission may be switched for every retransmission count.

Furthermore, the present embodiment may also be combined with embodiment 4.

Although cases have been explained with the above embodiments where the number of symbols of L1/L2 control information such as ACK/NACK and CQI, M-ary modulation value and coding rate are fixed by way of examples, the present invention is not limited to this, and, when, for example, the number of symbols of DATA, M-ary modulation value and coding rate vary according to channel quality and so on, the number of symbols of L1/L2 control information, M-ary modulation value and coding rate may be determined according to these changes.

The above described embodiments have shown an example where the basic TF's and derived TF's are stored in the form of a table, but the basic TF's and derived TF's may be defined in the form of equations as well.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-140462, filed on May 19, 2006, including the specification, drawings and abstract, is incorporated herein by reference in its entirety.

INDUSTRIAL APPLICABILITY

The radio transmitting apparatus and radio transmission method according to the present invention can improve throughputs of a downlink and uplink even when performing dynamic symbol allocation and is applicable, for example, to a 3GPP LTE radio communication system.

The invention claimed is:

1. A base station comprising:
a transmitter, which, in operation, transmits, to a mobile station, an index indicating a transmission format; and
a receiver, which, in operation, receives, from the mobile station, data and control information, of which coding processing is executed, the coding processing including a code rate adjustment for the data, wherein the code rate adjustment for the data is performed by changing a number of bits of the data with the transmission format depending on whether or not the control information is to be transmitted together with the data.

2. The base station according to claim 1, wherein the code rate adjustment for the data is performed in a way that differentiates a code rate of the data transmitted together with the control information from a code rate of the data transmitted without the control information.

3. The base station according to claim 1, wherein the control information is one or both of an acknowledgement/negative-acknowledgement (ACK/NACK) and a channel quality indicator (CQI) to be transmitted together with the data.

4. The base station according to claim 3, wherein the code rate adjustment for the data is performed by changing the number of bits of the data depending on whether the data is transmitted together with at least one of the CQI and the ACK/NACK or without either of the CQI and the ACK/NACK.

5. The base station according to claim 3, wherein the code rate adjustment for the data is performed by changing the number of bits of the data depending on whether the data is transmitted together with the CQI, with the ACK/NACK, with both of the CQI and the ACK/NACK, or without either of the CQI and the ACK/NACK.

6. The base station according to claim 3, wherein the code rate adjustment for the data is performed in a way that differentiates a code rate of the data transmitted together with at least one of the CQI and the ACK/NACK from a code rate of the data transmitted without either of the CQI and the ACK/NACK.

7. The base station according to claim 1, wherein the transmission format includes a transport block size for the data and a modulation scheme.

8. The base station according to claim 7, wherein the transport block size for the data is not varied depending on the control information to be transmitted together with the data.

9. The base station according to claim 1, wherein the coding processing includes a rate matching for the data.

10. A communication method comprising:
transmitting by a base station, to a mobile station, an index indicating a transmission format; and
receiving by the base station, from the mobile station, data and control information, of which coding processing is executed, the coding processing including a code rate adjustment for the data, wherein the code rate adjustment for the data is performed by changing a number of bits of the data with the transmission format depending on whether or not the control information is to be transmitted together with the data.

11. The communication method according to claim 10, wherein the code rate adjustment for the data includes differentiating a code rate of the data transmitted together with the control information from a code rate of the data transmitted without the control information.

12. The communication method according to claim 10, wherein the control information is one or both of an acknowledgement/negative-acknowledgement (ACK/NACK) and a channel quality indicator (CQI) to be transmitted together with the data.

13. The communication method according to claim 12, wherein the code rate adjustment for the data includes changing the number of bits of the data depending on whether the data is transmitted together with at least one of the CQI and the ACK/NACK or without either of the CQI and the ACK/NACK.

14. The communication method according to claim 12, wherein the code rate adjustment for the data includes changing the number of bits of the data depending on whether the data is transmitted together with the CQI, with the ACK/NACK, with both of the CQI and the ACK/NACK, or without either of the CQI and the ACK/NACK.

15. The communication method according to claim 12, wherein the code rate adjustment for the data includes differentiating a code rate of the data transmitted together with at least one of the CQI and the ACK/NACK from a code rate of the data transmitted without either of the CQI and the ACK/NACK.

16. The communication method according to claim 10, wherein the transmission format includes a transport block size for the data and a modulation scheme.

17. The communication method according to claim 16, wherein the transport block size for the data is not varied depending on the control information to be transmitted together with the data.

18. The communication method according to claim 10, wherein the coding processing includes a rate matching for the data.

* * * * *